United States Patent
New et al.

(10) Patent No.: US 7,689,940 B2
(45) Date of Patent: Mar. 30, 2010

(54) METHOD AND APPARATUS FOR ALLOCATING DATA PATHS

(75) Inventors: Wei Lee New, Singapore (SG); Tien Ping Chua, Singapore (SG)

(73) Assignee: Panasonic Corporation, Osaka (JP)

( * ) Notice: Subject to any disclaimer, the term of this patent is extended or adjusted under 35 U.S.C. 154(b) by 466 days.

(21) Appl. No.: 11/569,404

(22) PCT Filed: Nov. 19, 2004

(86) PCT No.: PCT/SG2004/000375

§ 371 (c)(1),
(2), (4) Date: May 17, 2007

(87) PCT Pub. No.: WO2005/114500

PCT Pub. Date: Dec. 1, 2005

(65) Prior Publication Data

US 2008/0216024 A1    Sep. 4, 2008

(30) Foreign Application Priority Data

May 24, 2004    (WO) ............... PCT/SG2004/000145

(51) Int. Cl.
   *G06F 17/50* (2006.01)
(52) U.S. Cl. ............................... 716/2; 716/18
(58) Field of Classification Search .............. 716/2, 716/18
   See application file for complete search history.

(56) References Cited

U.S. PATENT DOCUMENTS

| | | | |
|---|---|---|---|
| 5,541,849 A * | 7/1996 | Rostoker et al. | 716/18 |
| 5,742,814 A * | 4/1998 | Balasa et al. | 707/102 |
| 6,195,786 B1 * | 2/2001 | Raghunathan et al. | 716/2 |
| 6,209,119 B1 * | 3/2001 | Fukui | 716/2 |
| 6,385,757 B1 * | 5/2002 | Gupta et al. | 716/1 |
| 2004/0003354 A1 | 1/2004 | Hamlin | |
| 2006/0248487 A1 * | 11/2006 | Kapoor et al. | 716/6 |

OTHER PUBLICATIONS

Huang et al.; "Data path allocation based on bipartite weighed matching"; 27th ACM/IEEE Design Automation Conference; Jun. 24-28, 1990; pp. 499-504.*

(Continued)

*Primary Examiner*—Naum B Levin
(74) *Attorney, Agent, or Firm*—Baker Botts L.L.P.

(57) ABSTRACT

A method and apparatus to produce high-level synthesis Register Transfer Level designs utilises a trade-off between power dissipation and area usage in data path allocation. Power dissipation and area constraints and a priority between them are input. An algorithm automatically decides the number of registers that are to be used, according to the specified priority and constraints specified. Power management formulations can be used to gear the allocation process to trade lower power management costs for equivalent savings in register areas. Multi-criteria optimisation Integer Linear Programming is utilised with heuristically determined power and area weightings to suit different predefined requirements of the chip design. Bipartite weighted Assignment is used to determine the number of registers to be used at every stage, through cost formulations and the Hungarian Algorithm.

50 Claims, 10 Drawing Sheets

OTHER PUBLICATIONS

Lakshminarayana, G. "High-Level Synthesis of Power-Optimized and Area-Optimized Circuits from Hierarchical Data-Flow Intensive Behaviours", IEEE Transactions on Computer-Aided Design of Integrated Circuits and Systems, Mar. 1999, vol. 18, Issue 3, pp. 265-281, Mar. 1999.

Parulkar I., et al. "Data Path Allocation Techniques for High-Level Synthesis of Low BIST Area Overhead Designs", Design Automation Conference, 1995, Proceedings of the ASP-DAC '95/CHDL '95/VLSI'95, IFIP INternational Conference on Hardware Description Languages; IFJP International Conference on Very Large Scale Integration, Asian and South Pacific, 1995.

Krishnamoorthy, G., et al. "Data Path Allocation Using an Extended Binding Model", Proceedings of 28th ACM/IEEE Design Automation Conference, pp. 279-284, 1992.

* cited by examiner

```
for (i=0; i<n; i++)
{
        //Variables executed n times
        ..................................
        for (j=0; j<m; j++){
                //Variables executed m*n times
                ........................
                for (k=0; k<p; k++){
                        //Variables executed n*m*k times
                        ..........
                }
                ............
        }
}
```

```
for (k = 0; k < n; k++)
{ #pragma switch_iterations (20)
        ..............................
        for (j = 0; j < m; j++){
                #pragma switch_iterations (5)
                ...........................
        }
}
```

METHOD AND APPARATUS FOR ALLOCATING DATA PATHS

CROSS-REFERENCE TO RELATED APPLICATION

This application claims priority to PCT/SG2004/000375, entitled Method and Apparatus for Allocating Data Paths, filed Nov. 19, 2004, which claims priority to PCT/SG2004/000145 filed May 24, 2004.

TECHNICAL FIELD OF THE INVENTION

This invention relates to allocating data paths, for instance in circuit design.

BACKGROUND OF THE INVENTION

In circuit design, a designer may start with a behavioural description, which contains an algorithmic specification of the functionality of the circuit. High-level synthesis converts the behavioural description of a very large scale integrated (VLSI) circuit into a structural, register-transfer level (RTL) implementation. The RTL implementation describes an interconnection of macro blocks (e.g., functional units, registers, multiplexers, buses, memory blocks, etc.) and random logic.

A behavioural description of a sequential circuit may contain almost no information about the cycle-by-cycle behaviour of the circuit or its structural implementation. High-level synthesis (HLS) tools typically compile a behavioural description into a suitable intermediate format, such as Control-Data Flow Graph (CDFG). Vertices in the CDFG represent various operations of the behavioural description. Data and control edges are used to represent data dependencies between operations and the flow of control.

High-level synthesis tools typically perform one or more of the following tasks: transformation, module selection, clock selection, scheduling, resource allocation and assignment (also called resource sharing or hardware sharing). Scheduling determines the cycle-by-cycle behaviour of the design by assigning each operation to one or more clock cycles or control steps. Allocation decides the number of hardware resources of each type that will be used to implement the behavioural description. Assignment refers to the binding of each variable (and the corresponding operation) to one of the allocated registers (and the corresponding functional units).

In VLSI circuits, the dynamic components that are incurred whenever signals in a circuit undergo logic transition, often dominate power dissipation. However, not all parts of the circuit need to function during each clock cycle. As such, several low power design techniques have been proposed based on suppressing or eliminating unnecessary signal transitions. In general, the term used to refer to such techniques is power management. In the context of data path allocation, power management can be applied to data path allocation using the following techniques:

i) Operand Isolation

Inserting transparent latches at the inputs of an embedded combinational logic block, and additional control circuitry to detect idle conditions for the logic block. The outputs of the control circuitry are used appropriately to disable the latches at the inputs of the logic block from changing values. Thus, the previous cycles input values are retained at the inputs of the logic block under consideration, eliminating unnecessary power dissipation.

The operand isolation technique has two disadvantages. The signals that detect idle conditions for various sub-circuits typically arrive late (for example, due to the presence of nested conditionals within each controller state, the idle conditions may depend on outputs of comparators from the data path). Therefore, the timing constraints that must be imposed (i.e. the enable signal to the transparent latches must settle before its data inputs can change) are often not met, thus making the suppression ineffective. Further, the insertion of transparent latches in front of functional units can lead to additional delays in a circuit's critical path and this may not be acceptable in signal and image-processing applications that need to be fast as well as power efficient.

ii) Constrained Register Sharing Technique for Low Power VLSI Design

Spurious operations are avoided by constraining register sharing in data path allocation, according to US patent publication no. U.S. Pat. No. 6,195,786 B1, issued on 27 Feb. 2001 to Raghunathan et al. In this scheme, judicious sharing of the registers is allocated so that the output variables to some operations sharing a common register do not result in unnecessary switching to the inputs of other functional units.

The data path allocation utilises perfect power management, at least in so far as it relates to spurious switching activities, which requires the input to every functional unit to be connected to registers that are not connected to the input of any other functional unit. This rigid requirement results in an architecture with power savings and area overheads that vary in proportion to the amount of sharable resources and the nature of the CDFG. In constrained register sharing, where the sequence of values appearing at one input of a functional unit in any iteration corresponds to $v1\_1, v2\_1, \ldots, vi\_1$ and the sequence of values appearing at the other input of the functional unit in any iteration corresponds to $v1\_2, v2\_2, \ldots, vi\_2$, then the values at the inputs of the functional unit in any clock cycle corresponds to some pair $(vj\_1, vj\_2)$, $1 \leq j \leq i$.

FIG. 1 is an illustration of non-constrained use of two registers. FIG. 2 is an illustration of constrained sharing of a register. In FIG. 1, a first register R1 provides a first variable Var A to an arithmetic logic unit (ALU) during a first clock period and a second variable Var B to a multiplier (MULT), which also receives an input from elsewhere, during a second clock period after the first clock period. With constrained sharing of a register, as exemplified in FIG. 2, a second register R2 is additionally provided. The first register R1 provides the first variable Var A to the arithmetic logic unit (ALU) during the first clock period and the second register R2 provides the second variable Var B to the multiplier (MULT) during the second clock period. Spurious switching activity is avoided by constraining sharing. However, this leads to an increased number of Registers.

Constrained register sharing has been reported as providing power savings of 8.4% to 33.0% and area overheads spanning from −4.0% to 6.4%. A related paper was published by the inventors named in the above-mentioned US patent publication no. U.S. Pat. No. 6,195,786 B1, G. Lakshminarayana, A. Raghunanthan, N. K. Jha, and S. Dey, "Power management in high level synthesis," IEEE Trans. VLSI Systems, vol. 7, no. 1, pp. 7-15, March 1999. In this paper, a reduction in power (mean 23.05, standard deviation 13.3%) at an area overhead of 0% to 13.8% is reported with a bandpass example tested under throughput constraints of 59, 72 and 86 cycles. It was noted that the power savings and area overheads increased with an increase in sampling periods because increased sampling periods facilitated increased register sharing, which led to an increase in the execution of spurious operations. In order to eliminate spurious operations, register sharing has to be inhibited to a greater extent compared with tightly performance-constrained designs.

Constrained register sharing management, though resulting in good power savings, has area overheads that are dependent on the Data Flow Graph properties. For a Data Flow Graph (DFG) with many sharable operations and variables, the area overhead incurred in this allocation scheme is large. Large area overheads are incurred with constrained register sharing management for DFG, where many output variables of operations extend to more than one operation in the subsequent control steps, i.e. operations have inputs connected to other operations. This is especially so as the chances of spurious switching activities arising from sharing of registers for such variables are higher. The rigid conditions of the constrained register sharing do not provide a developer with the flexibility to generate RTL designs that use registers less than is required at the data path allocation phase.

The cost of a die is generally proportional to four times its area. It is therefore cost efficient to produce RTL designs of minimal area to lower production costs. However, with the emergence of portable or mobile computing and communication devices such as laptops, palmtop computers, mobile telephones, wireless modems, handheld video games, etc., power consumption has become another major consideration in all RTL designs. Excessive power dissipation in integrated circuits not only discourages their use in a portable environment, but also causes overheating, which degrades performance and reduces chip lifetime. To control their temperature levels, high power chips require specialised and costly packaging and heat sink arrangements. Excessive power consumption is a limiting factor in integrating more transistors on a single chip or on a multiple-chip module.

The requirements of area and power of a chip design differ in scale according to the applications the chip serves to cater. For portable devices and high-density microelectronic devices, the power dissipation of VLSI circuits is a critical concern. For non-portable devices and less-dense microelectronic devices, power dissipation may be of less significant consideration compared to that of the die area.

SUMMARY OF THE INVENTION

According to one aspect of the present invention, there is provided a method of data path allocation. The method comprises generating an initial allocation of resources and determining if the allocation of resources meets a predetermined first constraint. If the constraint is not met, a revised allocation of resources is generated based on a tradeoff between lower area usage and lower power usage. Revised allocations are generated and tested against the first constraint until the first constraint is met.

According to another aspect of the present invention, there is provided apparatus for data path allocation. The apparatus comprises means for generating an initial allocation of resources and means for determining if the allocation of resources meets at least one predetermined constraint, the at least one predetermined constraint comprising at least one of a predetermined area constraint and a predetermined power usage. The apparatus also comprises means for generating a revised allocation of resources based on a trade-off between one of area usage and power usage being lower and the other of area usage and power usage being higher. The apparatus further comprises means for determining if the revised allocation meets the at least one predetermined constraint. The apparatus additionally comprises means for controlling the apparatus to generate revised allocations and determine if the revised allocation meets the at least one predetermined constraint until the at least one constraint is met.

According to a further aspect of the invention, there is provided apparatus for data path allocation operable according to the method of the first aspect.

According to yet another aspect of the invention, there is provided a computer program product having a computer program recorded on a computer readable medium, for data path allocation. The computer program product comprises computer program code means for generating an initial allocation of resources and computer program code means for determining if the allocation of resources meets at least one predetermined constraint, the at least one predetermined constraint comprising at least one of a predetermined area constraint and a predetermined power usage. The product also comprises computer program code means for generating a revised allocation of resources based on a trade-off between one of area usage and power usage being lower and the other of area usage and power usage being higher. The product further comprises computer program code means for determining if the revised allocation meets the at least one predetermined constraint. The product additionally comprises computer program code means for controlling the apparatus to generate revised allocations and determine if the revised allocation meets the at least one predetermined constraint until the at least one constraint is met.

According to again a further aspect of the invention, there is provided a computer program product having a computer program recorded on a computer readable medium, for data path allocation operable according to the method of the first aspect.

Embodiments of the invention can be used to provide interactive interfaces to high-level synthesis tools to address the priorities of optimisation techniques and to generate circuits with areas and power consumption properties that are within constraints specified by a developer, for an assortment of chip development requirements.

BRIEF DESCRIPTION OF THE DRAWINGS

The invention is described by way of non-limitative example with reference to the accompanying drawings, in which:—

DETAILED DESCRIPTION OF THE INVENTION

Figure 1:
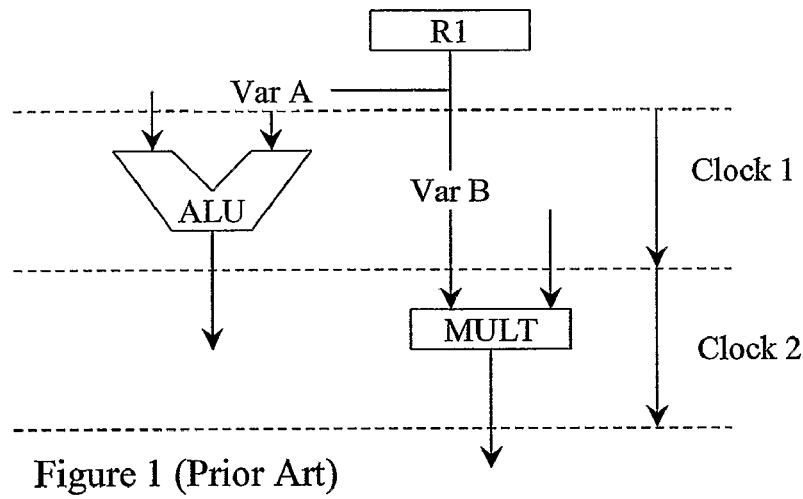
FIG. 1 illustrates known, non-constrained register use of two functional units and two registers.
Figure 2:
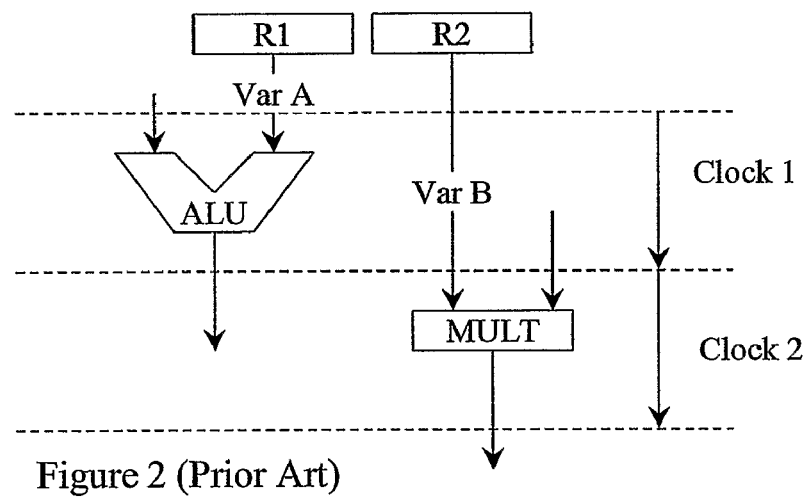
FIG. 2 illustrates known, constrained register use of two functional units and one register.

The described embodiment uses what may be termed imperfect power management. The embodiment uses a trade-off between improved area usage, arising from more registers sharing, and increased power management costs incurred through more registers sharing.

The described embodiments of the invention are useful in the data path allocation optimisation phase of high-level synthesis, with module allocation (operations-to-functional-units binding) and register allocation (variables-to-registers binding) as the two subtasks to accomplish. Trade-off costs between improved power management and the number of registers used are compared, preferably at every allocation stage, through power management cost formulation, to yield an optimal allocation. A developer can decide the allocation style through indications of power and area constraints and their relative optimisation priorities. Furthermore, the developer can affect the allocation with his knowledge of the frequencies that the loops are iterated at high-level abstraction, through a compiler directive.

In terms of power management, the trade-off of spurious power for area is less significant for loops that are less frequently called, i.e. loops that are less deeply nested and loops that are seldom called. Also the trade-off of spurious power for area is less significant for functional units that consume relatively less power. Thus variables in the less frequently called and less deeply nested loops are assigned lower power management costs compared to those that are more frequently called and more deeply nested. This gears register allocation that trades power for area towards these variables in the less frequently called and less deeply nested loops, as they contribute less to the power dissipation in the circuit.

The user can intervene in the allocation process, in the main embodiment through the use of a compiler directive that allows the user to specify the rate of switching of a particular basic block, for instance in high-level C abstractions. This compiler directive allows the user to affect the allocation process, with the assignment of power management costs proportional to those specified by the user.

The described embodiments also allocate data paths using a bipartite weight assignment algorithm. The number of registers allocated is determined automatically by bipartite weight assignment based on weights associated with graph edges. These weights are modelled using area and power costs and weight factors reflecting the relative importance of area and power for the particular design.

The trade-offs between power management and area are modelled, together with weighting coefficients of power and area, determined heuristically in the data path allocation process. This leads to a formulation of imperfect power management costs to guide allocation to yield reduced power dissipation configurations at various data path allocation stages.

The described embodiments can be used to generate a RTL design iteratively. For a circuit that has area as its priority in data path allocation optimisation, the iterations start with a design that has optimal register sharing. The design iterations terminate when the estimated power is within that specified by the developer. For data path allocation optimisation with power as its priority, the RTL design iteratively generates a RTL design with minimum power dissipation, yielding perfect power management as its initial solution. The design phase stops when the estimated area is within that specified by the developer in the user-interface.

Figure 3:
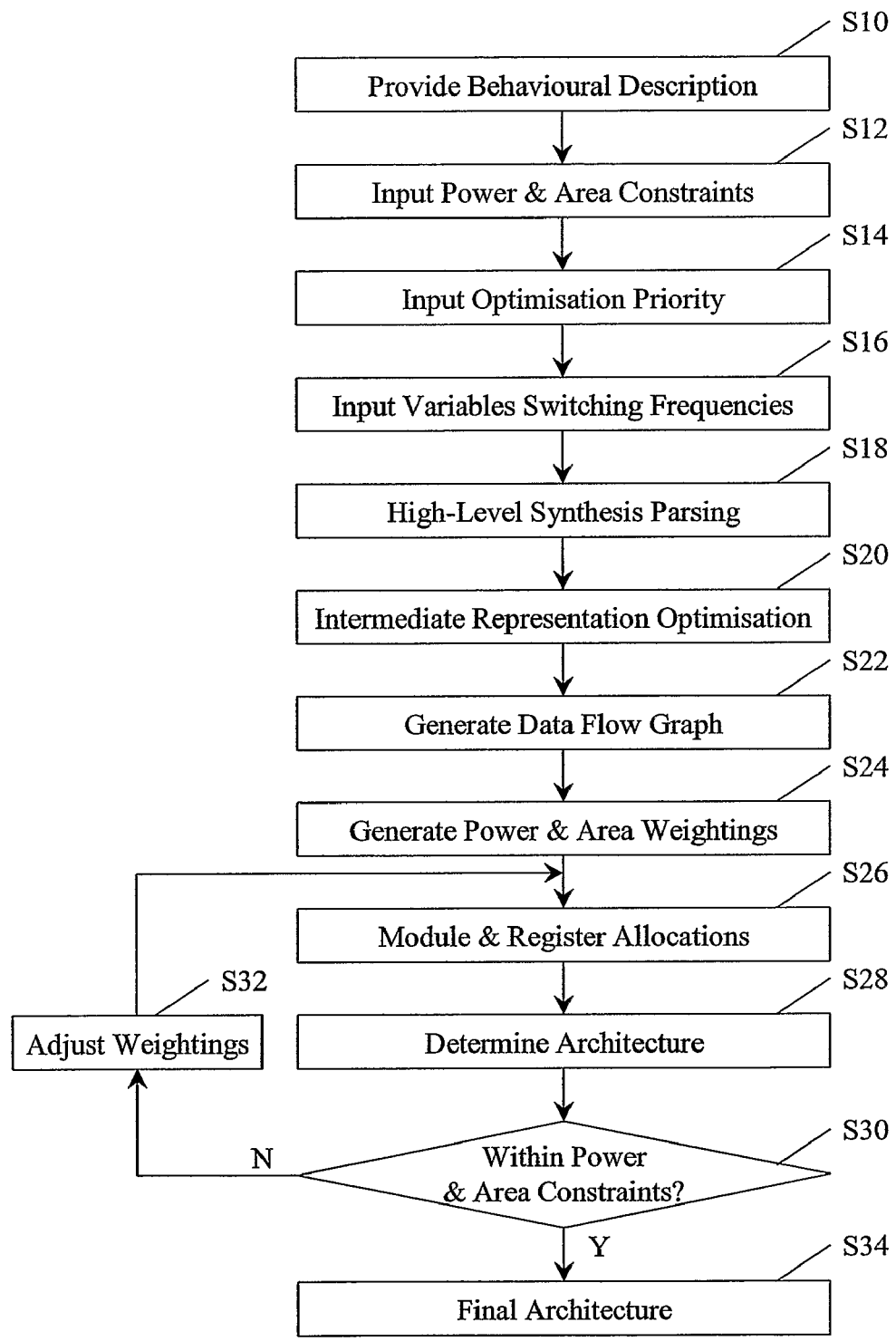
FIG. 3 is an overview flowchart relating to the operation of an embodiment of the invention.

FIG. 3 is an overview flowchart relating to the operation of an embodiment of the invention, to generate hardware designs based on specified constraints and an optimisation priority.

A behavioural description of a circuit is provided (step S10). Power and area constraints are input (step S12). These may be input by a machine or by a user using an interface such as a keyboard or graphical user interface. The power and area constraints specify the maximum allowable power consumption and the maximum allowable area for the circuit under design. An optimisation priority is input (step S14). The optimisation priority may be input by a machine or by a user using an interface such as a keyboard or graphical user interface. The optimisation priority specifies which is more important, reduced area or reduced power consumption.

Switching frequencies of the variables for the circuit design are provided (step S16). This is typically by way of a compiler directive which provides the frequencies to a behavioural synthesis tool such as an HLS compiler, at a high level abstraction input (such as C source). The switching frequencies, which may be defined by the user or computed by the upper phase of the compiler, are used during the resource allocations phase in the calculation of spurious power dissipations introduced by the sharing of registers that results in imperfectly power managed architecture.

The behavioural description is parsed (step S18) using the input constraints and optimisation priority, for instance by an HLS compiler. An intermediate representation is also optimised (step S20), by any one of several known ways. Common techniques to optimize intermediate representations include software pipelining, loop unrolling, instruction parallelizing scheduling, force-directed scheduling, etc. These methods are usually applied jointly to optimise intermediate representations. A data flow graph (DFG) is scheduled with the switching frequencies of the variables (step S22). The parsed description is compiled to schedule the DFG.

Initial power and area weightings are generated (step S24). Based on the optimisation priority of the targeted design, an initial, maximum weight factor is assigned to the costs related to the higher optimisation priority and an initial, minimum weight factor is assigned to the lower optimisation priority. Thus the initial allocations are completely biased to the higher priority optimisation criterion.

For the current weightings, modules and registers are allocated in the circuit design (step S26), as is described later, leading to a proposed architecture (step S28), in the form of an RTL design. The architecture is evaluated against the defined input constraints; does it fall within those constraints (step S30)? If one of the constraints is not met, the weighting factors are adjusted (step S32) to generate a design with greater consideration given towards that constraint. Thus, if the architecture fails the area constraint, the area weighting factor is increased and/or the power weighting factor is decreased. The process reverts to step S26 to generate a new architecture for evaluation. On the other hand, if both constraints are satisfied in step S30, the process stops with the current architecture as the final architecture (step S34). Thus the hardware generation and evaluation process stops when the specified constraints are satisfied.

Relationship Between Area & Power

Figures 4, 5, 7:
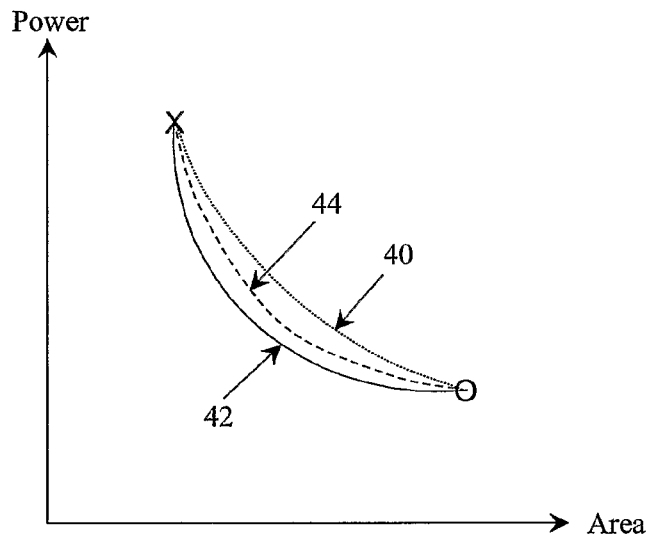
FIG. 4 is a graph illustrating trade-off between power and area use.
FIG. 5 is an illustration of a loop with several nested loops.
FIG. 7 is an illustration of the use of a compiler directive to specify the number of iterations a loop is switched.

FIG. 4 is a graph of power use against area for a circuit design. The lines and points on the graph schematically illustrate how power use and area typically vary against each other. The design point with maximal hardware sharing, and minimal area use in register allocation is indicated by "X". The optimal design point from a power management point of view, and maximum area use, is indicated by "O". The two lines 40, 42 illustrate potential trade-offs between power (from a power management point of view) and the extent of register sharing (and thereby area).

The dotted curved line 40 illustrates a typical design locus of inferior power and area, where the tradeoffs between area and power are not carefully managed. The solid curved line 42 illustrates a typical optimum design locus where current optimum power management and register sharing is arrived at through judicious allocation of registers. Dashed line 44 illustrates a design locus, where less than optimum power management and register sharing is arrived at, for instance using only loop nest information as is described below.

With judicious register allocation, the reduction in area with respect to the increase in power is greater in the initial effort to deviate from the design of perfect power management.

Architectures pertaining to less deeply nested loops contribute to a lesser extent to power dissipation compared to those pertaining to inner nested loops. Spurious activities that arise from the sharing of registers for the outermost loop contribute to a minimal amount of power dissipation. Attempts to trade off power for area savings should thus start from the least used architectures. FIG. 5 is an illustration of a loop with several nested loops. FIG. 5 illustrates the number of times variables are used for one iteration of a circuit algorithm. For the outermost nested loops the variables are used n times. For a second level nested loop, the variables are switched m*n times. For a third level nested loop, the variables are switched at rate of n*m*k, and so on. The contribution to power use is proportional to the rate the variables are used. Thus, in trading power for register area, through imperfect power management, the least frequently switched variables should be shared as they contribute the least to the power dissipation. The trade-off curves 42 and 44 are thus less steep for design points close to the perfectly managed architecture. As the less frequently switched registers are used up in trading power for area, the trade-off costs of area per power unit increases, leading to the increased gradient of the trade-off curve as the design moves further away from the perfectly power managed architecture.

Further management to optimise the tradeoffs between area and power management is possible from examining the factors that contribute to the amount of spurious activities introduced through the sharing of registers for variables in data path allocation. Better decisions can be made in allocating which registers are shared to reduce the amount of spurious activities introduced by the shared use.

Figure 6:
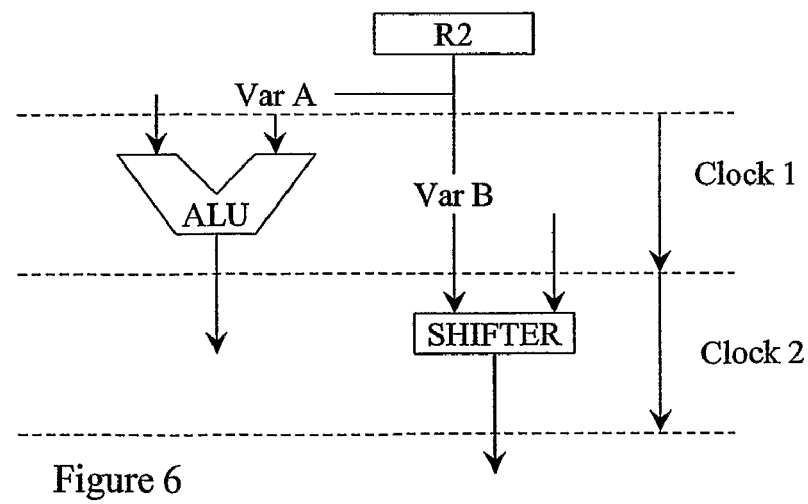
FIG. 6 illustrates constrained register use between an ALU and a shifter.

Assuming an equivalent amount of switching for the functional units, spurious activities can be kept to a minimum by sharing registers between functional units that use less switching for an equivalent change in input vectors. FIG. 6 illustrates sharing of a register between an adder (ALU) and a shifter. Power dissipation from spurious switching introduced by sharing a common input register between an adder and a shifter is much less than that from spurious switching introduced by sharing a common input register between an adder and a multiplier, as in FIG. 1 assuming the spurious switching between the shifter and multiplier candidates are the same.

The cumulative amounts of spurious activities introduced through sharing for all registers are used as a guideline to achieve minimum power loss for the sharing of a register among different variables. The most cost-effective sharing results in the solid curve 42 design locus as shown in FIG. 4.

Thus judicious allocation of registers, trading power for area in a power management scheme allows a developer to generate designs along or closer to the optimal power-area trade-off curve, to balance the contradictory objectives of power and area minimisation within the specified constraints.

Compiler Directives

Compiler directives give the circuit developer finer control over the data path allocation process. A compiler directive is inserted at the beginning of a function's source code and allows the user to specify the rate of switching of that particular function. This comment (pragma) facility allows a user to direct the optimiser to trade power savings off for area towards variables located within the less frequently called loops.

An example of the use of such a directive is given in FIG. 7, written in C source code, where a user is able to assign an iteration number for a comment "#pragma switch_iterations (Iteration_number)". The compiler assigns a default value with a known "Iteration_number" when the developer does not insert a compiler directive in a particular loop. This default value is derived from previously used iteration numbers, for example an average of all previously known iteration numbers (or an average of just the last few of them, for instance the last 5). Referring to FIG. 7, if n is 100, then the "Iteration_number" is automatically assigned by the compiler to be 100. If n is assigned in the earlier steps of the input program execution flow and is undeterminable by the compiler, the user-assigned "Iteration_number" through the compiler directive is used to establish the rate of switching in a particular loop.

The use of this information in power management cost formulation is described later, with reference to an Equation 3.

Data Path Power & Area Optimisations

Power and area optimisations are carried out automatically according to the specified settings: i) priority of optimisation (area/power); ii) area constraint (e.g. in units of area such as $mm^2$); and iii) power constraint (e.g. in power measurements units such as μW).

In data path allocation, it is assumed that scheduling has been done a priori. The clock and voltage are fixed for the allocation. Only multiplexers are used for interconnect allocations, due to various drawbacks of bus interconnections:

i) As chip size increases, the probability that two interconnections are located far apart increases and combining them may produce buses that run a long distance. The length of a highly utilised bus tends to increase linearly with the dimensions of a chip, which hurts the performance as well increasing the cost [F. Brewer and D. Gajski, "Chippe: A system for constraint driven behavioural synthesis", IEEE Trans. Computer-Aided Design, vol. 9, July 1990]; and ii) Bus-architectures are not easily testable.

Floor-planning information is not used in the allocation as, in general, fewer functional hardware units and fewer registers produce designs with lower wiring costs. This has been determined in: W. E. Donath, "Placement and average interconnection lengths of compute logic", IEEE Trans. Circuits and Systems, vol. 26, April, 1979; W. R. Heller, C. G. His and W. F. Mikhail, "Wireability—Designing wiring space for chips and chip packages", IEEE Design and Test, vol. 1, August, 1984; "Techniques for area estimation of VLSI layouts", IEEE Trans. Computer-Aided-Design, vol. 8, January 1989; "Optimal and Heuristic Algorithms for Solving the Binding Problem", Minjoong Rim, Ashutosh Mujumdar, Rajiv Jain, and Renato De Loene, IEEE Transactions on VLSI Systems, Vol. 2. No. 2, June 1994.

Multicriteria optimisation is used in an Integer Linear Programming (ILP) Formulation to solve the data path allocation problem, which is part of step S26 of the flowchart of FIG. 3. The ILP formulation used to co-optimise area and power is described in Equation 1 below.

$$\min_{x \in C} f(x) = \begin{bmatrix} K_{power} & f_{power}(x) \\ K_{area} & f_{area}(x) \end{bmatrix} \quad [1]$$

where $f_{power}$ (x) is the cost formulation of power $f_{area}$ (x) is the cost formulation of area C={constraints of the minimum number of registers at the maximum variable density for register allocation or that of the minimum number of functional units at the maximum operations density for module allocation}

$K_{power}$ is the weight of $f_{power}$ (x), and $K_{area}$ is the weight of $f_{area}$ (x)

The costs associated with each possible allocation are used to generate a matrix. The best result, which is the minimum total cost for every operation, variable etc. to be allocated, is found by the Hungarian method.

Figure 8:
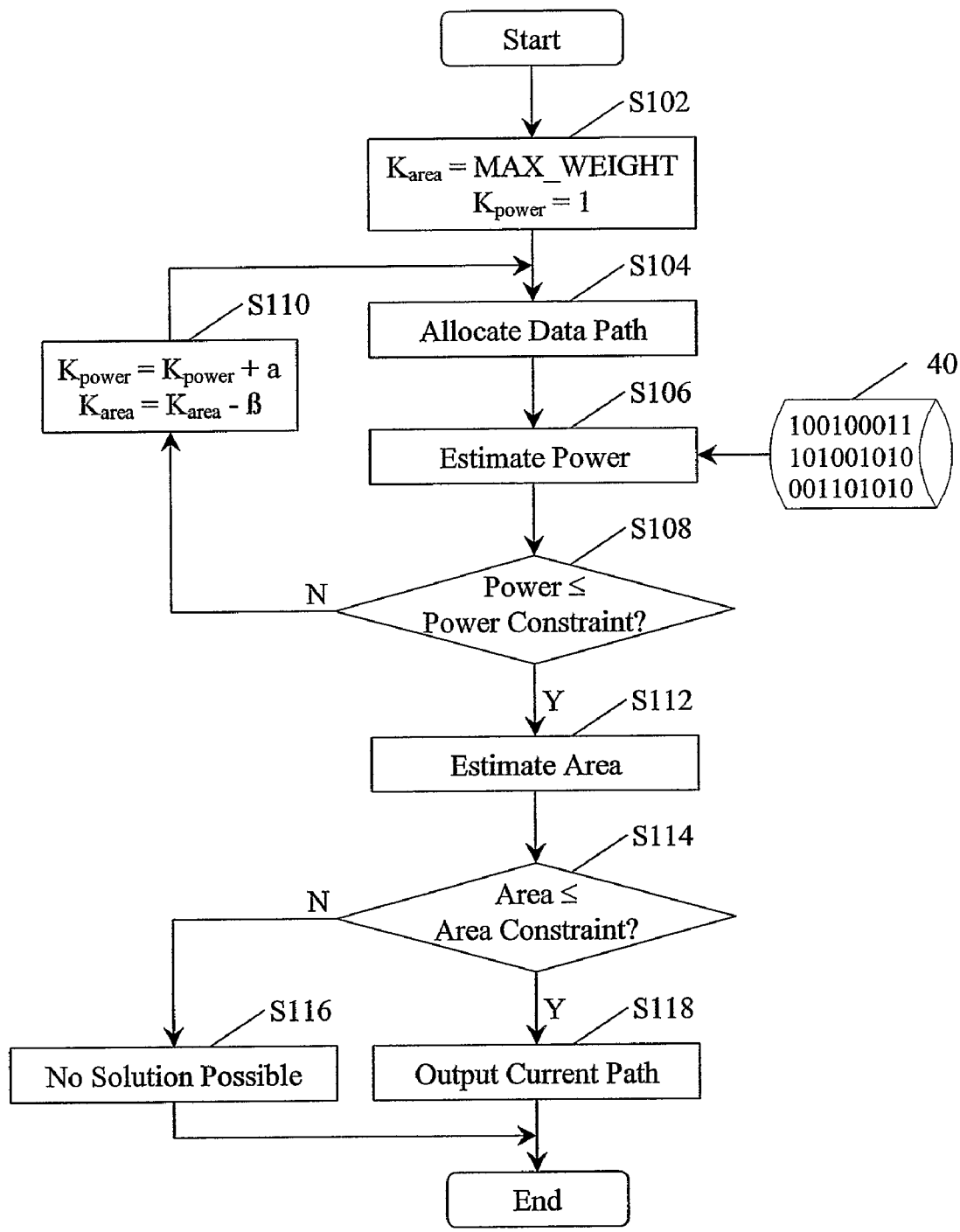
FIG. 8 is a flowchart illustrating optimisation in data path allocation where area is of a higher priority.
Figure 9:
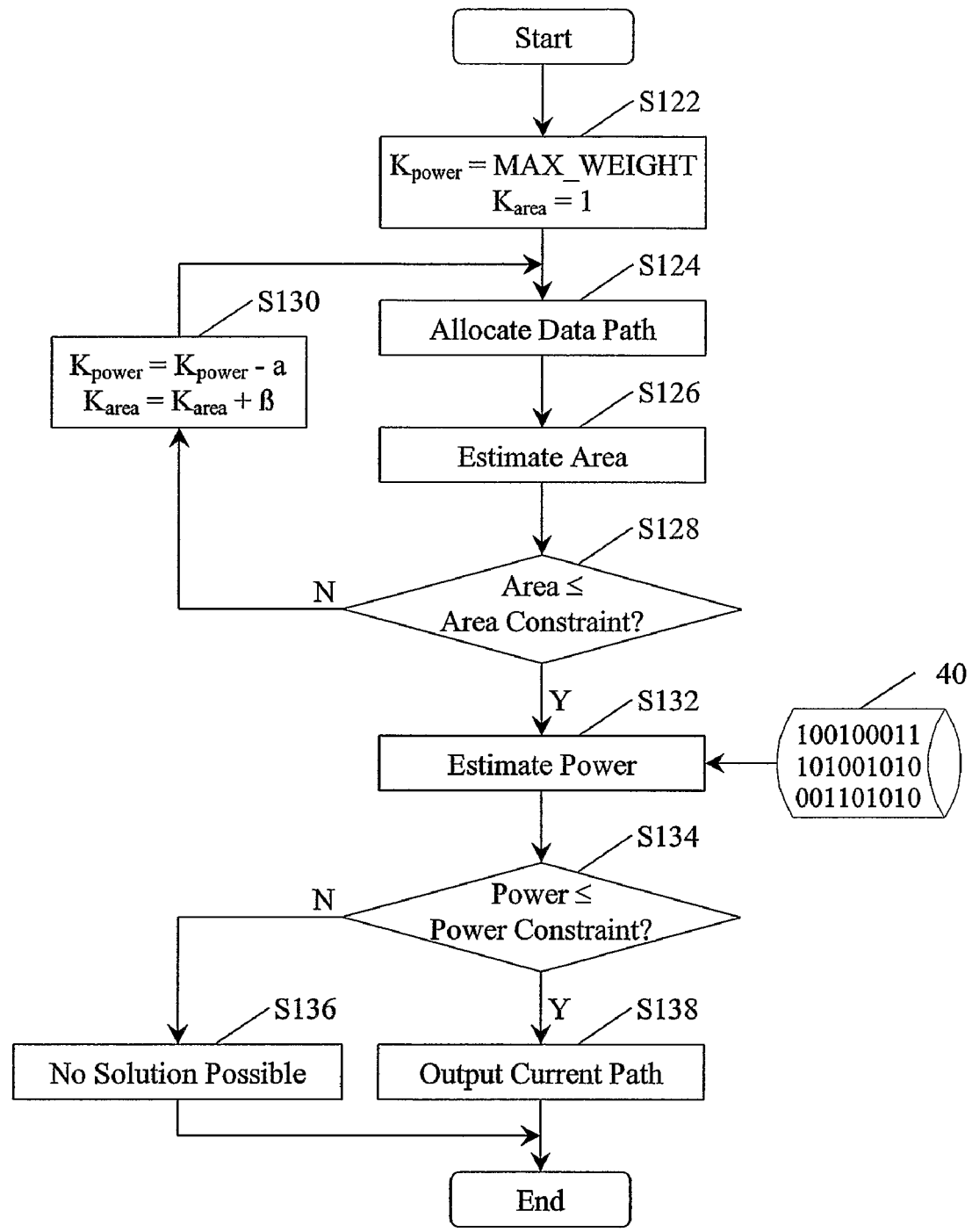
FIG. 9 is a flowchart illustrating optimisation in data path allocation where power is of a higher priority.

FIG. 8 is an example of an optimisation scheme for data path allocation, where area is of higher priority. FIG. 9 is an example of an optimisation scheme for data path allocation, where power is of higher priority.

For FIG. 8, the initial solution is characterised by data path allocation that achieves optimal area through maximal register sharing. Thus, initially, the power weight factor, $K_{power}$ is set to 1 while area weight factor, $K_{area}$ is set to MAX_WEIGHT (step S102—a specific example of step S24 from FIG. 3). Based on the current weighting, a data path allocation is generated (step S104—a generalisation of steps S26 and S28 from FIG. 3). The power dissipation of the circuit is then estimated, with a random or pre-chosen input bit pattern 40 (step S106), for instance using an RTL Power estimation tool, using power usage information from a pre-characterised cell library. A determination is made of whether the estimated power is less than the preset power constraint (step S108—part of step S30 of FIG. 3). If the power dissipation exceeds the power constraint, $K_{power}$ is increased by a first heuristically determined step value a, and $K_{area}$ is reduced by a second heuristically determined step value β (step S110—a specific example of step S32 from FIG. 3). The data path allocation process (step S104) is repeated for the new weightings. If the estimated power dissipation is less than the constraint amount according to step S108, the area for the current path allocation is estimated, for instance using a Synopsis DC compiler (step S12). A determination is made as to whether the area is less than the preset area constraint (step S114). If the area exceeds the allowable area, no solution is possible for the entered constraints (S116) and the process ends. If the area is within the allowable area, the current data path allocation is output (S118) and the process ends.

An example of an heuristic method for determining the step values used for each iteration of the simulation is described below.

Firstly, a maximum value for both $K_{area}$ and $K_{power}$ is chosen such that they do not result in overflow (greater than 32 bits) on multiplication with the costs $f_{power}$ (x) and $f_{area}$ (x) Equation 1). In this exemplary embodiment, the maximum value $K_{area}$ and $K_{power}$ is capped to 1000. The difference in the number of registers required for the two extreme designs, one with $K_{area}$ set to 1 and $K_{power}$ set to the maximum weight (1000) and the other with $K_{area}$ set to the maximum weight (1000) and $K_{power}$ set to 1 are first determined by carrying out two simulations. The difference in number of registers for these two design configurations (the one for the perfect power management scheme and the other for the most imperfect power management scheme) shows the maximum result range in register numbers attainable by the simulations in the entire optimisation space. This range is indicative of the difference in optimisation results.

The weights regions (1 to max, i.e. 1000 in this embodiment) are first divided into N regions, where the constants used for each region of the optimisation locus are determined before the start of simulations for each particular weight region. N is higher if the precision desired is higher. N is chosen to be 4 in this exemplary embodiment, with the weights region divided (near-)uniformly to {1, 250, 500, 750, 1000} for step values α and β. 1 is used as the first value so that, for the design optimisation at the extremes, consideration is still given to the objective (power or area) that is of lower priority. If 0 is assigned as the weight for the less important objective, the compiler does not perform allocation that optimises the less important objective at all for cases where the costs for the candidates of the more important objective are same.

The maximum number of registers required at the intersection of the first two regions, i.e. at weight settings of (250 for $K_{area}$, 750 for $K_{power}$) in this embodiment, is first determined. The result range for the first region is obtained from the difference between the maximum register number required at this intersection and that obtained for the initial weight settings of (1, 1000). The result range for this first region is then normalised by the maximum result range obtained from the designs at the two extremes of the design locus (i.e. the result range from (1, 1000) to (1000, 1)). The step value chosen for an iteration of the simulation for this first region is obtained by dividing the normalised result range evenly into steps of a desired normalised change (i.e. each step should change the number of registers a certain fraction of the result range), assuming a linear relationship between the weight and results. For example, if the result range for the first region {(1, 1000), (250, 750)} is 10%, that is 0.1 of the maximum range of simulation result {(1, 1000), (1000, 1)} and 0.02 is the desired normalised change in the results desired for each iteration (i.e. the number of registers should change by 2% of the number of registers in the result range from (1, 1000) to (1000, 1)), the step value for each iteration is set to be a fifth (0.02/0.1) of 250, i.e. 50 for both α and β.

If a suitable path allocation solution is not determined within the first region, {(1, 1000), (250, 750)}, a new set of step values is determined for the second region, {(250, 750), (500, 500)} and so on for the third and fourth regions if necessary.

According to the heuristic method described above, the step values cc and D are likely to change every few iterations (after the first five for the first region), according to the results of the heuristic determination. Alternatively, the step values may be kept constant, for instance at 50 for both α and β throughout. The step values α and β do not have to be the same.

The initial trade-off of area for a same amount of power savings is small and increases progressively as the design moves away from point "X" of FIG. 4. This is because the most frequently used variables are constrained from sharing registers in the initial trade-off, yielding large power savings of power for a fixed unit of area. The design iterations stop when the pre-defined power constraint is met. The effect of this scheme is an architecture that has the optimum area with the minimum area traded off for the maximum possible power savings to meet the pre-defined power constraint.

FIG. 9 illustrates a scheme with power as the priority in the optimisation. The initial solution is characterised by data path allocation with perfect power management. $K_{area}$ is set to 1 while $K_{power}$ is assigned MAX_WEIGHT. (step S122—a specific example of step S24 from FIG. 3). Based on the current weighting, a first data path allocation is made (step S124—a generalisation of steps S26 and S28 from FIG. 3). The area of the generated RTL is estimated or analysed (step S126), for instance using a Synopsis DC compiler. A determination is made of whether the area is less than the preset area constraint (step S128—part of step S30 of FIG. 3). If the area exceeds the area constraint, $K_{power}$ is reduced by a first heuristically determined step value α, and $K_{area}$ is increased by a second heuristically determined step value β (step S130—a specific example of step S32 from FIG. 3). The data path allocation process (step S124) is repeated for the new weightings. If the area is less than the constraint amount according to step S128, then the power dissipation associated with the current data path allocation is estimated (step S132). A random or pre-chosen input bit pattern 40 and power usage information from a pre-characterised cell library are used, for instance by an RTL Power estimation tool. A determination is made as to whether the estimated power dissipation is less than the preset power constraint (step S134). If the estimated power exceeds the allowable power, no solution is possible for the entered constraints (S136) and the process ends. If the estimated power is within the allowable power, the current data path allocation is output (S138) and the process ends.

The step values may be calculated in a similar manner to that described earlier, or in other ways, or may be kept constant.

The trade-off cost of power for a fixed unit of area increases as the design moves away from point "O" of FIG. 4, the design with optimum power. This is because the least used variables are used in the register sharing to trade power off for area initially, thus sacrificing the minimal power dissipation for an imperfectly managed architecture. As the least used architectures are sacrificed to trade power off for area, the trade-off costs of power for the same unit of area increases. The design scheme results in an optimal power-managed architecture with the minimum power traded off for the maximum area savings, to meet the pre-defined area constraint.

Data Path Allocation Program

Figure 10:
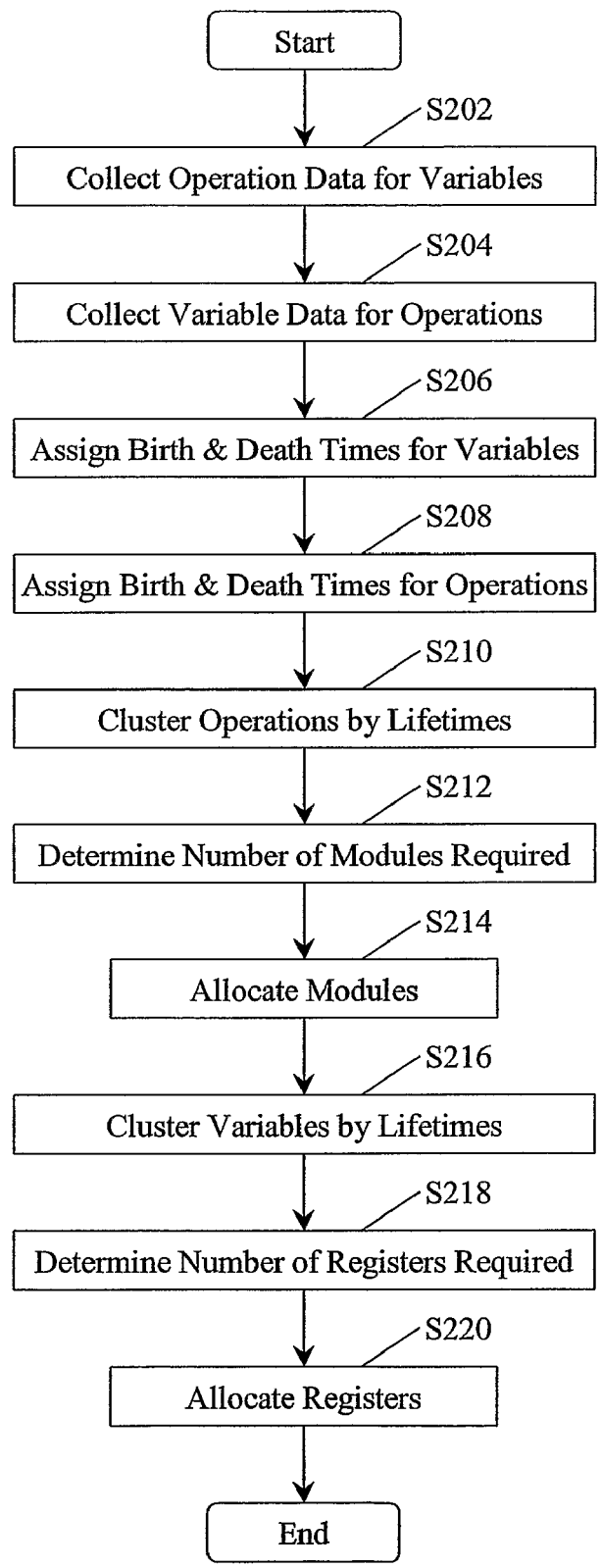
FIG. 10 is a flowchart illustrating a data path allocation process.

FIG. 10 is a flowchart illustrating a data path allocation process for fulfilling the constraints described by the ILP formulation (Equation 1), for instance as is used in the processes described above with reference to FIGS. 8 and 9, in steps S104 and S124, respectively. The subtasks to accomplish within data path allocation are module allocation (operations-to-functional-units binding) and register allocation (variables-to-registers binding). In this exemplary embodiment, module allocations are carried out followed by register allocations, although it could be simultaneous or the other way round.

Operation data for every variable is collected (step S202), that is information on the operations at which the variables are derived (Op_from) to the operations where the variables are used (Op_destinations). Variable data for every operation is collected (step S204), that is information on the variables used and derived by every operation. A birth time and a death time is assigned to every variable (step S206), from an analysis of the operation data for every variable. A birth time and a death time is assigned to every operation (step S208).

The operations are first grouped according to the functions required, that is by module type. Operations requiring the same module types, i.e. operations that could share the same functional units, are clustered according to their lifetimes and deathtimes (based on birth and death) (step S210). The operations are first sorted in ascending order according to their birth times. A cluster of mutually unsharable operations is allocated according to the sorted order (two operations are unsharable if and only if their lifetimes overlap). The number of modules of each type required is determined (step S212). For each potential type of module, the required number is the maximum number of operations that could share that type of module, which occur simultaneously in any one control step. The total number of modules of each type may be more than but no fewer than the maximum number of operations in any one cluster of operations using that module type. Modules are then allocated to the different operations (S214).

The variables are clustered according to their lifetimes and deathtimes (based on birth and death) (step S216). The variables are first sorted in ascending order according to their birth times. A cluster of variables unable to share the same register is allocated according to the sorted order (two variables are unable to share the same register if and only if their lifetimes overlap). The number of registers required is determined (step S218). The required number is at least the maximum number of variables which exist simultaneously in any one control step. The total number of registers may be more than but no fewer than the maximum number of variables in any one cluster. Registers are then allocated to the different variables (S220).

An example of the step of allocating modules (step S214 of FIG. 10) is now described with reference to FIG. 11.

The module types are all allocated a module type number. Modules that could share a common functional unit are grouped under the same module type. All modules of the same module type have the same latency (time from birth to death). The module type numbers allocated to the module types are allocated in descending latency order. That is the module type with the highest latency has the lowest module type number (i.e. 0) and the module type with the lowest latency has the highest module type number. Module types of the same latencies are allocated different successive numbers randomly Likewise, each cluster of operations for each module type is allocated a number.

The process of allocating modules is initiated by setting a first module type to be allocated, module type=0 (step S302). A check is made of whether the current module type number is higher than the last (highest possible) module type number (step S304). If the current module type number is not higher than the last module number, a current operation cluster number is set to 0, for the current module type (step S306). All the operations in the current operation cluster number for the current module type are assigned to a different functional unit of the current module type (step S308). The modules are allocated in decreasing order of latency for the operations in the current cluster. The current operation cluster number is then increased by one (step S310).

A check is made of whether the current operation cluster number is higher than the last (highest) operation cluster number (step S312). If the current operation cluster number is higher than the last operation cluster number, the current module type number is increased by one (step S314), and the process reverts to step S304. If the new current module type number is not higher than the number of the last module type, the operations in the first operation cluster that use the modules of this next module type are allocated to modules of this next type (by step S308).

If the current operation cluster number is not higher than the last operation cluster number at step S312, a matrix or graph is constructed for module allocation (step S316). The matrix or graph is based on the existing allocation of modules (for the first operation cluster and any other operation clusters processed so far) and the current operation cluster number. Any allocation problems are solved (step S318) to produce an allocation for all the clusters processed so far for the current module type.

The current operation cluster number is then increased by one (step S320), and the process reverts to step S312.

Once the module allocation process has cycled through all the module types, step S304 will find that the module type number is greater than the last or highest module type number and the module allocation process outputs the module allocation (step S322) for all the module types.

The module allocations are carried out for operations in descending latencies order. This is because the chances of the modules having overlapped lifetimes are higher for operations of longer latencies compared with those of shorter latencies. For operations of lower latencies, the actual functional units assigned for operations of higher latencies are used in the analysis rather than the operations themselves.

The operations of sharable functional units are assigned cluster by cluster to the functional units using Bipartite Weighted Assignments. A Weighted Bipartite graph, WB=(S, T, E) is constructed to solve the matching problem, where each vertex in the graph, $s_i \in S(t_j \in T)$ represents an operation $op_i \in OP$(functional unit $fu_j \in FU$) and there is a weighted edge, $e_{ij}$, between $s_i$ and $t_j$ if, and only if, $op_i$ can be assigned to $fu_j$, (i.e. none of the operations that have already been bound to $fu_j$ has its lifetime overlaps with $op_i$'s). The weight $w_{ij}$ associated with an edge $e_{ij}$ is calculated according to area and power cost formulations and the respective associated weight factors (using Equation 1 and as is described below, with reference to Equations 2 and 3). The allocation of every module cluster is modelled as a matching problem on a weighed bipartite graph and solved by the well-known Hungarian Method [C. H. Padadimitriou and K. Steiglitz, Combinatorial Optimisation, Prentice-Hall, 1982], for instance as is discussed later with reference to Table 2.

The power and area costs of the graph edges are combined linearly with the weights assigned as the weighting factor for the costs. Bipartite Weighted Assignments are then performed.

An example of the step of allocating registers (step S220 of FIG. 10) is now described with reference to FIG. 12.

A current variable cluster number is set to 0 (step S352). All the operations in the current variable cluster are assigned to a different register (step S354). The current variable cluster number is then increased by one (step S356).

A check is made of whether the current variable cluster number is more than the last variable cluster number (step S358). If the current variable cluster number is not more than the last variable cluster number at step S358, a matrix or graph is constructed for register allocation (step S360). The matrix or graph is based on the existing allocation of registers (for the first variable cluster and any other variable clusters processed so far) and the current variable cluster. Any allocation problems are solved (step S362) to produce an allocation for all the variable clusters processed so far.

The current variable cluster number is then increased by one (step S364), and the process reverts to step S358, from which register allocation for the next variable cluster can be generated, if the next variable cluster number is not more than the highest variable cluster number.

Once the register allocation process has cycled through all the variable clusters, step S358 will find that the variable cluster number is greater than the last (highest) variable cluster number and the register allocation process outputs the register allocation (step S366).

The variables are also assigned to the registers cluster by cluster using Bipartite Weighted Assignment. The allocation of every register cluster is also modelled as a matching problem on a weighed bipartite graph and solved by the well-known Hungarian Method. With the Bipartite Weighted Assignments performed for all the operations and variables in the input DFG, the generated RTL design can then be evaluated against the user-defined input constraints.

The resource allocation allows the automatic determination of the number of registers used in the assignment of resources by assigning the number of new nodes in the register subset equal to the number of nodes in the variable subset. A register number greater than that required for a particular allocation could allow for better power management. The total number of registers allocated is determined by the outcome of a Bipartite Weighted Allocation for a particular pair of weight factors and area and power edge cost formulations associated with it.

Cost Formulations

Figure 11:
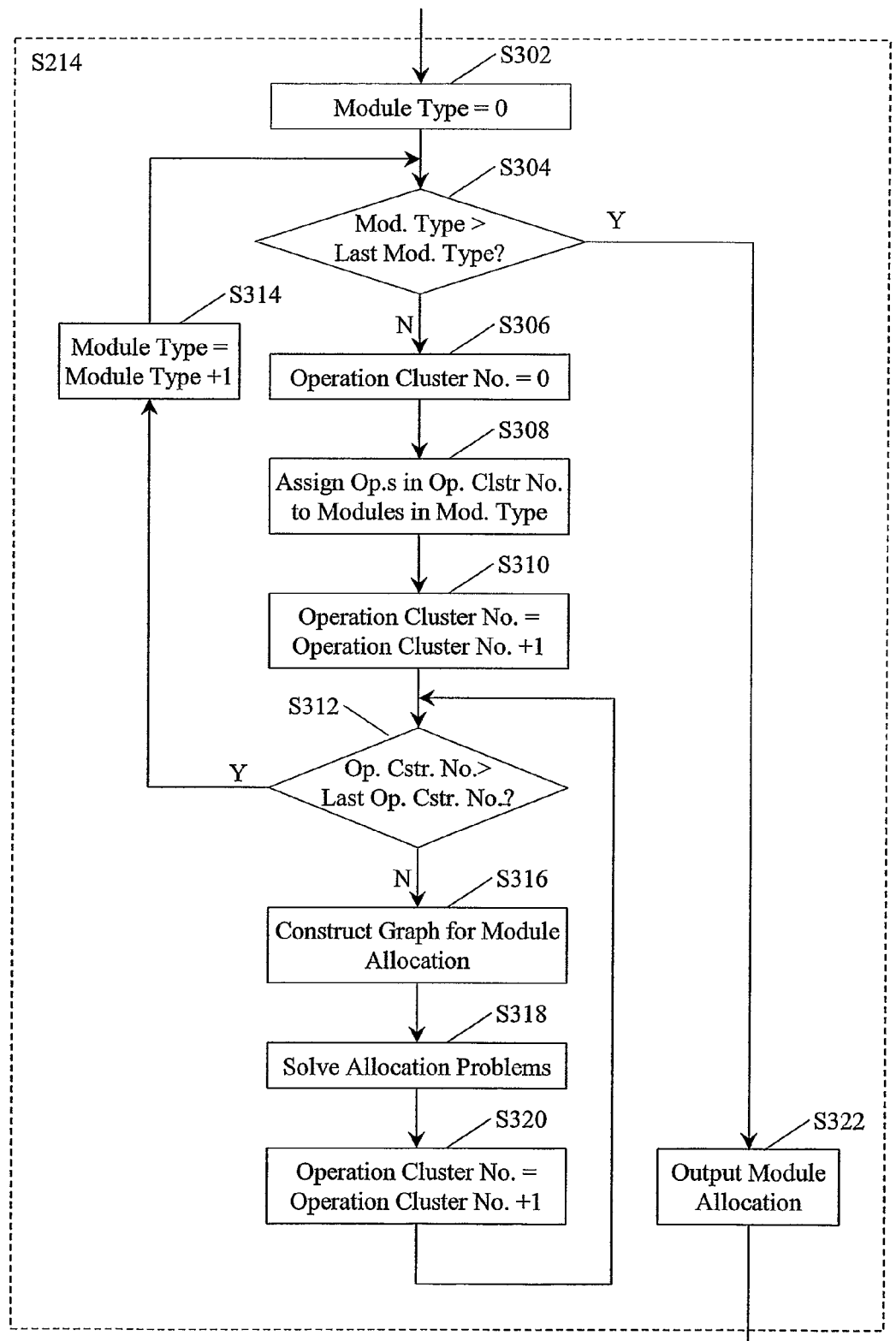
FIG. 11 is a flowchart illustrating a module allocation process.

Module Allocation—Area Cost Calculation (for step S316 of FIG. 11)

The only relevant area costs that can change in module allocation are those due to the number of multiplexers (MUXs). Thus, in module allocation, the cost formulation of area, $f_{area}$ (x), used in equation 1, is determined as follows:

$$f_{area}(x) = \text{(sum of multiplexer area costs)} \quad [2]$$

For this implementation, functional units are always shared where possible. There is no allocation of extra functional unit, unlike register allocation where extra registers maybe provided for perfect power management. The module allocation phase is a phase to decide how to share the functional units so that at their input and at the registers input, the least MUX power usage and best power managed configurations are generated.

The number of multiplexers (MUX) at the inputs to registers and to functional units is kept down by using Bipartite weighted assignment targets. MUX area requirements for the input and output variables of an operation are assessed in the module allocation area cost formulation, $w_{ij}$, indicated in Equation 3 below, as are generated for step S316 of FIG. 11. For every allocation of an operation to a functional unit, Equation 3 is used first to assess the explicit MUX costs incurred at the input to the register (although the register is not allocated until the register allocation phase, the necessity of the register is recognised in the module allocation phase and can be costed accordingly). Equation 3 is then used to compute the implicit costs incurred at the input to the functional units.

$$w_{ij} = |((\text{Overlap}(op_i, op_j))*[\text{Overlap}(var_i, var_j)| \\ ((Op_i == Op_j).\text{Overlap}(Op_i, Op_j)))*C_{MUX}] + \text{Overlap}(op_i, op_j)*M_{[3]}$$

where i, j are the indexes of the operation candidate and the module in comparison, respectively;

$var_i$, $var_j$ are the variables (input or output to the operation);

$C_{mux}$ is the estimated cost of the MUX (for instance based on the MUX bit width);

MAX is a maximum value, assigned when a match is not possible, as the operations cannot share the same functional unit (value should not be so high that the cost indicated causes overflow);

Overlap( ) returns 1 if the variables or the operations from which the variable arrives when the variable is an input variable, or the operations to which the variable passes for an output variable, have overlapping lifetimes and 0 otherwise;

$op_i$, $op_j$ are the operations candidate and module's past allocated operation in comparison respectively; and Op is either the operation from which the variable arrives when the variable is an input variable to the module, or the operation to which the variable passes for an output variable from the module.

At the input to an input of a module, an explicit MUX cost is incurred when the variables that pass to the module come from different operations. At the output from a module, an implicit MUX cost is assigned to combinations that do not pass to a common functional unit, so as to encourage sharing of modules that pass to a common functional unit over other combinations. This is because if the operations that pass to a common functional unit are assigned to different modules, an MUX cost would be incurred. The MUX costs are only implicit at this point as they may not necessarily be incurred, i.e. when none of the combinations consists of variables that pass to a common functional unit. However, whether the costs are in fact incurred is not determined until a particular module allocation has chosen and the registers are allocated. Given that implicit costs are therefore uncertain, alternative embodiments may ignore them.

If the operations have overlapping lifetimes, the modules cannot be shared.

Hence the result will always be the maximum score:

Overlap($op_i$,$op_j$)=1. Therefore $\overline{(\overline{\text{Overlap}(op_i,op_j)})}$=0

Thus the only result can be 1*MAX=MAX.

If the operations do not have overlapping lifetimes, Overlap($op_i$,$op_j$)=0. Therefore Overlap($op_i$,$op_j$)*MAX=0. However, there may still be MUX area costs.

This depends on whether the variables of the operations have overlapping lifetimes and whether operations have overlapping lifetimes and whether the same operation is used for both variables.

If the variables of the operations have overlapping lifetimes, Overlap(vari, varj)=1. If the succeeding or preceding operations have overlapping lifetimes, $\overline{(\overline{\text{Overlap}(Op_i,Op_j)})}$=0. Therefore $\overline{(op_i==Op_j).\overline{\text{Overlap}(Op_i,Op_j)}}$=1. If either the succeeding or preceding operations or the variables have overlapped lifetime and the operations do not then have an overlapping lifetime, the result is 1*1*$C_{MUX}$=$C_{MUX}$.

If the same operation is used, ($Op_i$==$Op_j$)=1. If the operations do not have overlapping lifetimes and the variables do not have overlapping lifetimes too, $\overline{(\overline{\text{Overlap}(Op_i,Op_j)})}$=1. Therefore $\overline{(Op_i==Op_j).\overline{\text{Overlap}(Op_i,Op_j)}}$=0 and Overlap($var_i$, $var_j$)=0. Therefore the MUX area cost is zero.

An MUX is necessary if the variables have overlapping lifetimes, as they cannot share a common register. If the variables do not have overlapping lifetimes, the variables can share a common register. At the input to a shared register an MUX cost is avoided if the variables assigned to the register succeed from a common functional unit. This is only possible if the variables both succeed from similar operations that could share a functional unit and these operations do not have overlapping lifetimes. At the input to a functional unit, an MUX cost is avoided if the input variables to the functional unit are assigned to a common register.

Module Allocation Power Cost Formulation (for Step S316 of FIG. 11)

The relevant power costs that can change in module allocation are those due to the allocation of multiplexers (MUXs) and power management costs. Thus, in module allocation, the cost formulation of power, fpower (x), used in equation 1, is determined as follows:

$$f_{power}(x) = (\text{sum of power management costs}) + (\text{sum of multiplexer power costs}) \quad [4]$$

The total power increase in module allocation due to an MUX is proportional to the MUX area increase. The MUX area increase can be derived from Equation 3 above.

Power management costs are computed for identical operations that could share the functional unit assigned to an operation of the same kind in a preceding operation cluster. The pre-condition to satisfy in power management cost computation is that the lifetimes of the output variables that are candidates for register sharing do not overlap with output variables of past allocations of a module, since module allocation is carried out with register allocation in mind so that the functional units are allocated in a manner that allows best power management in register allocation.

The formulation of costs associated with power involves the computation of spurious activities introduced by the sharing of registers. This is achieved by considering the switching activities of the variables involved in sharing and the spurious power dissipation introduced by the variables to the functional units connected to the shared register if the variables were to share a common register. Information on switching activities may be provided by the designer, for instance using a compiler directive or provided automatically as is mentioned earlier. The spurious activities introduced by a first variable are computed from the switching activity of that first variable, multiplied by the power metrics of the operations of the other variables with which the first variable shares a register. Module allocation make use of this information to share the modules in a manner favourable to the allocation of the registers.

Module Allocation Power management cost $$\text{Module Allocation Power management cost} = SA_{Var1} \sum_{i=1}^{n_{Var2}} Power_i + SA_{Var2} \sum_{i=1}^{n_{Var1}} Power_i \quad [5]$$

where

Var1 is a first input variable to its destination operations of interest;

Var2 is a second input variable to its destination operations of interest;

SA is the switching activity of the variable with respect to all variables;

n is the number of destination operations; and

Power is the normalised power consumption of an operation that is not sharable with any of the destination operations of the other variable (spurious activity).

A register switches when the input to it changes. However, for overall power consumption when the output of functional unit switches, whether the output is latched to a shared or unshared register, the power consumption of the registers still remains the same, i.e. one register will have to be switched.

On the other hand, multiplexers that are present will consume power and they make a difference to the overall power consumption. The power management costs are costs associated only with unnecessary functional unit switching. They have no relationship to register switching or multiplexer switching power loss.

Referring to FIGS. 1 and 6, this formulation of Equation 5 gears the assignment of a module towards one that yields lower power management costs. Variable A's destination operation is an ADDER (ALU). Variables B and C have destination operations of a MULTIPLIER and a SHIFTER respectively. The switching rate of the variables B and C is the same as for Variable A. The allocation task favours a lower power management cost. There is a lower power management cost if variable A shares a common register with variable C instead of variable B, since $Power_{shifter}$ is lower than $Power_{multipier}$.

Referring further to Equation 5, if the destination operation of Variable 1 is the same as that of Variable 2, with the two operations not having overlapping lifetimes (i.e. the two operations can be carried out by the same functional unit), no power management cost is incurred since no spurious activity is introduced through the registers sharing (i.e "$Power_i$" is zero for both components on the right-hand side of equation 5).

As was mentioned earlier, switching activity is lower for outer nested loops compared to inner nested loop of the programme, as was discussed above. This formulation of Equation 5 thus gears the trade-off of imperfect power management for area savings towards the less active loops.

Figure 12:
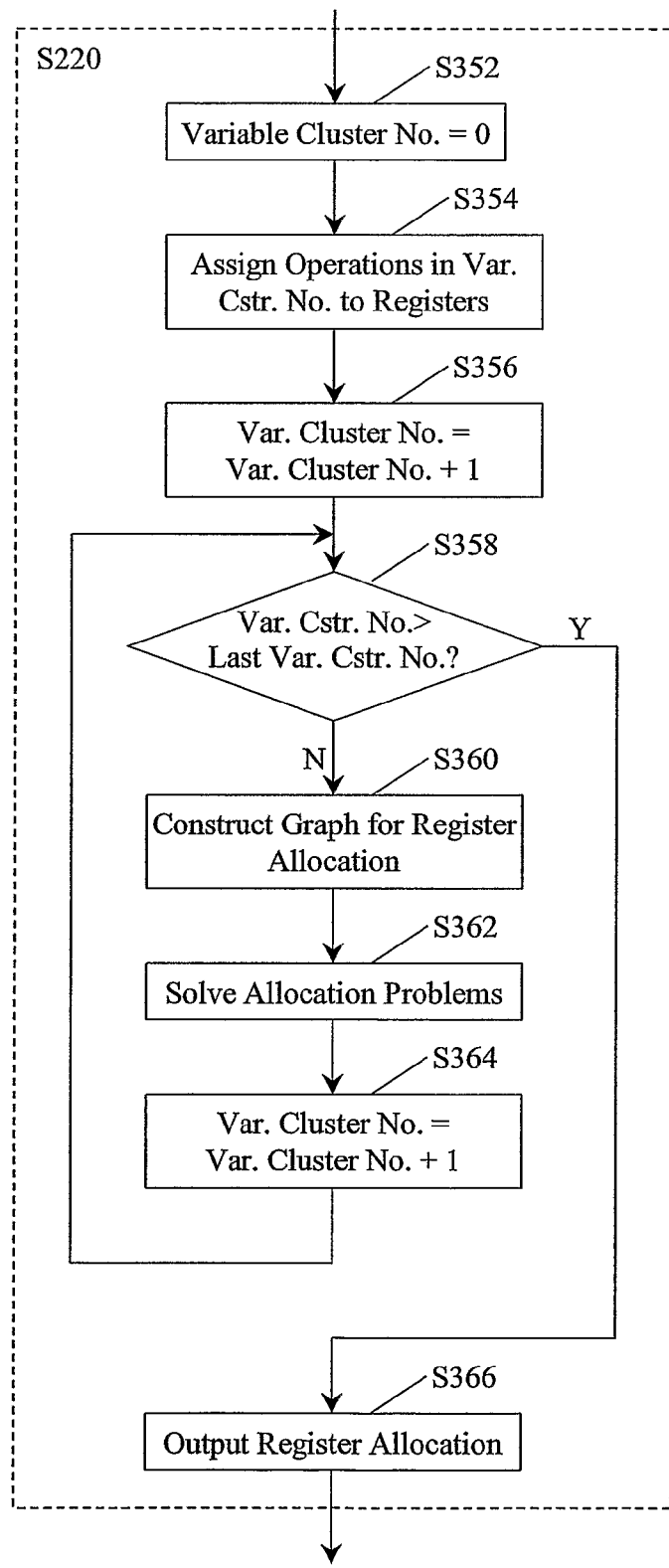
FIG. 12 is a flowchart illustrating a register allocation process.

Costs Formulations for Area and Power for Register Allocations (for Step S360 of FIG. 12)

The area and cost formulations for register allocation are similar to those described with reference to Equations 3 and 5 above. The operations used in the cost formulations are replaced by the functional units assigned through the module allocation.

Register Allocation—Area Cost Calculation

The relevant area costs that can change in register allocation are those due to the number of multiplexers (MUXs) and the number of registers. Thus, in register allocation, the cost formulation of $f_{area}$ (x), used in equation 1, is determined as follows:

$$f_{area}(x) = (\text{sum of multiplexer area costs}) + (\text{sum of register area costs}) \quad [6]$$

If a register is shared by 2 variables which pass from different functional units, an MUX cost is incurred. Likewise, if two variables pass to a common functional unit but do not share the same register, an MUX cost is incurred. MUX area requirements for the input and output variables of an allocated register are assessed in the register allocation area cost formulations, $x_{ij}$, indicated in Equations 7a and 7b below.

Where a register is already allocated, Equation 7a is used first to assess the explicit MUX costs incurred at the input to the register, after which Equation 7a is further used to compute the implicit costs incurred at the output from the register and the input to the functional units.

$$w_{ij} = \overline{((\text{Overlap}(i,j))} * [(\overline{(fu_i == fu_j).\text{Overlap}(fu_i, fu_j)}) * C_{MUX}] +$$

where i is the variable to be assigned to the register in the current allocation;

j is one of the variables already assigned to the register in a previous register allocation, if the register is shared;

$C_{MUX}$ is the estimated cost of the MUX (for instance based on the MUX bit width);

MAX is a maximum value, assigned when a match is not possible, as the variables cannot share the same register (value should not be so high that the cost indicated causes overflow);

Overlap( ) returns 1 if the variables or the functional units to or from which the variables pass have overlapping lifetimes and 0 otherwise; and fu is the allocated functional unit to which the variable passes from the register or from which the variable passes to the register.

At the input to the register, an explicit MUX cost is incurred when the variables that pass to the register come from different functional units. At the output from the register, an implicit MUX cost is assigned to combinations that do not pass to a common functional unit, so as to encourage the sharing of register for variables that pass to a common functional unit over other combinations. This is because, if the variables that pass to a common functional unit are assigned to different registers, an MUX cost would be incurred. The costs are implicit as they may not necessarily be incurred, for example, when none of the combinations consist of variables that pass to common functional unit. However, whether the costs are in fact incurred is not determined until the registers for the entire cluster are allocated. Given that implicit costs are therefore uncertain, alternative embodiments may ignore them.

If the variables i,j have overlapping lifetimes, Overlap(i,j)=1. Therefore $(\overline{\text{Overlap}(i,j)})=0$. Thus the result will always be at least 1*MAX=MAX.

If the variables i,j do not have overlapping lifetimes, Overlap(i,j)=0. Therefore Overlap(i,j)*MAX=0. However, there may still be MUX area costs. This depends on whether the operations have overlapping lifetimes and whether the same functional unit has been allocated to both variables.

If the functional units for variables i,j have overlapping lifetimes, $\overline{((\text{Overlap}(fu_i, fu_j))}=0$. Therefore $\overline{(fu_i == fu_j)}.\overline{\text{Overlap}(fu_i, fu_j)}=1$. If the variables i,j do not then have overlapping lifetimes, the result is $1*1*C_{MUX}=C_{MUX}$.

If the two functional units for variables i,j are the same, $(fu_i == fu_j)=1$. If the functional units for variables i,j do not have overlapping lifetimes, $\overline{((\text{Overlap}(fu_i, fu_j))}=1$. Therefore $\overline{(fu_i == fu_j)}.\overline{\text{Overlap}(fu_i, fu_j)}=0$. Therefore the MUX area cost due to the shared register is zero.

On assessing the implicit costs incurred, if the variable i passes to or from the same functional unit as a variable j already allocated to a different register in a previous register allocation, then the implicit cost is $(fu_i == fu_j) = 1*C_{MUX}=1*C_{MUX}=C_{MUX}$.

The MUX area requirements for the input and output variables of an unallocated register, i.e. a newly allocated register, are assessed in the register allocation area cost formulation, $x_{ij}$, indicated in Equation 7b below $$x_{ij} = [((fu_i == fu_j))*C_{MUX}] \quad [7b]$$

An MUX cost is incurred if the variables that pass to the same functional unit do not share a common register.

Register Allocation—Power Cost Calculation

The relevant power costs that can change in register allocation are those due to the allocation of multiplexers (MUXs) and power management costs. Thus, in register allocation, the cost formulation of power, $f_{power}$ (x), used in equation 1, is determined as follows:

$f_{power}(x)$=(sum of power management costs)+(sum of multiplexer power costs) [8]

The total power increase in register allocation due to MUX power costs is proportional to the MUX area increase. The MUX area increase can be derived from Equation 7 above.

Register Allocation Power management cost = [9]

$$SA_{Var1} \sum_{i=1}^{n_{Var2}} Power_i + SA_{Var2} \sum_{i=1}^{n_{Var1}} Power_i$$

where

Var1 is the variable being allocated to the Register;

Var2 is the variable which previously used this Register;

SA is the switching activity of the variable with respect to all variables;

n is the number of destination operations; and

Power is the normalised power consumption of the allocated functional unit that is not shared by the two variables.

The formulation of costs associated with power involves the computation of spurious activities introduced by the sharing of registers. This is achieved by considering the switching activities of the variables involved in sharing and the spurious power dissipation introduced by the variables to the functional units connected to the shared registers. Information on switching activities may be provided by the designer, for instance using a compiler directive or provided automatically as is mentioned earlier. The spurious activities introduced by a first variable are computed from the switching activity of that first variable, multiplied by the power metrics of the functional units of the other variables with which the first variable shares a register.

The minimum number of registers needed is the maximum number of registers in use at any one moment. This could include use for variables needed in two or more different clusters, if they overlap in time. However, this would lead to increased power costs. On the other hand, the circuit being designed could use a different register for each variable. This would have reduced power costs but larger area costs. This embodiment works out the costs associated with allocating variables to different registers (using weightings to allocate costs according to which of area and power management is more important), then works out which combination of allocations produces the best result. The process works this out on a cluster by cluster basis. Thus the possible allocations of variables to register in a cluster are limited by the allocations of previous clusters. Potential candidates for any cluster include all the registers that have been allocated so far, that is the cumulative number of registers used until that particular allocation, plus a number of registers equal to the number of variables in the current cluster. However, certain allocations will not be possible due to overlapping lifetimes. In which case, the cost associated with that combination is high, being at least the MAX value from equation 7 above.

Illustration of Automatic Register Number Determination Through Weights

Figure 13:
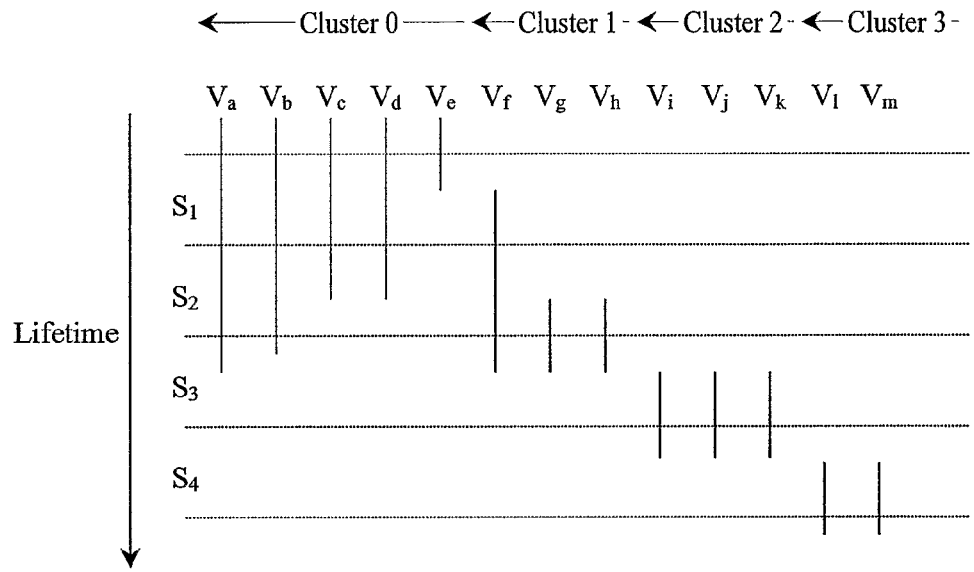
FIG. 13 schematically illustrates clustering of variables with overlapped lifetimes.

FIG. 13 schematically illustrates variables with their lifetimes in numbers of control steps ($S_1$ to $S_4$), clustered into Variable Clusters (Cluster 0 to Cluster 3). After the initial allocation of registers to Variable Cluster 0, the allocation to the variables in Cluster 1 does not necessarily require additional registers, since the total number of variables in Cluster 1 is fewer than in Cluster 0 and the number of variables in Cluster 0 that do not overlap with the variables' lifetimes in Cluster 1 is the same as or more than the number of variables in Cluster 1. To be more precise, in this instance, there are three variables in Cluster 0 that do not overlap with the three variables' lifetimes in Cluster 1. However, for this scheme, to allow for perfect power management (as opposed to only imperfect power management), the total number of registers available as candidates for the allocation is eight instead of five. (five from Cluster 0 and three additional registers to allow for perfect power management allocations).

An example that illustrates the automated registers allocation is provided below. This scheme automates the decision to use extra registers for better power management and the number of extra registers used, considering the trade-off between power and area involved.

Consider a module allocation result as shown in Table 1. For register allocation of Cluster 0 in FIG. 13, Variables a, b, c, d, and e are assigned to R1, R2, R3, R4 and R5, respectively, without discretion (in step S354 of FIG. 12). This is because no cost is incurred during the first Cluster assignment.

TABLE 1

Module Allocation Results

| Variable | Originating Module Code | Destination Module Code |
|---|---|---|
| ... | ... | ... |
| c ∈ R3 | None | FU4$^+$ (Adder 4) |
| d ∈ R4 | None | FU1$^{<<}$ (Shifter 1) |
| e ∈ R5 | None | FU1$^-$ (Subtractor 1) |
| f | FU1$^+$ (Adder 1) | FU1$^-$ (Subtractor 1) |
| g | FU2$^+$ (Adder 2) | FU1* (Multiplier 1) |
| h | FU3$^+$ (Adder 3) | FU1$^/$ (Divider 1) |

TABLE 2

Costs Assignments for Cluster 1

| | Variable | | | |
|---|---|---|---|---|
| Register | f | g | h | |
| R1 | Not Possible | Not Possible | Not Possible | ... |
| R2 | Not Possible | Not Possible | Not Possible | ... |
| R3 | Not Possible | $K_{area}(C_{MUX} + C_{MUX\_implicit})$ + $K_{power}[SA(g).Power(FU4^+)$ + $SA(c).Power(FU1^*)$ + $Power(C_{MUX})]$ | $K_{area}(C_{MUX} + C_{MUX\_implicit})$ + $K_{power}[SA(h).Power(FU4^+)$ + $SA(c).Power(FU1^/)$ + $Power(C_{MUX})]$ | ... |
| R4 | Not Possible | $K_{area}(C_{MUX} + C_{MUX\_implicit})$ + $K_{power}[SA(g).Power(FU1^{<<})$ + $SA(d).Power(FU1^*)$ + $Power(C_{MUX})]$ | $K_{area}(C_{MUX} + C_{MUX\_implicit})$ + $K_{power}[SA(h).Power(FU1^{<<})$ + $SA(d).Power(FU1^/)$ + $Power(C_{MUX})]$ | ... |

TABLE 2-continued

Costs Assignments for Cluster 1

| Register | Variable | | | |
|---|---|---|---|---|
| | f | g | h | |
| R5 | $K_{area}(C_{MUX})$ + $K_{area}(C_{MUX})$ | $K_{area}(C_{MUX} + C_{MUX\_implicit})$ + $K_{power}[SA(g).Power(FU1^-)$ + $SA(e).Power(FU1^*)$ + $Power(C_{MUX})]$ | $K_{area}(C_{MUX} + C_{MUX\_implicit})$ + $K_{power}[SA(h).Power(FU1^-)$ + $SA(e).Power(FU1^-)$ + $Power(C_{MUX})]$ | ... |
| R6 | $K_{area}(C_{MUX}$ + Reg_costs) + $K_{power}[Power(C_{MUX})]$ | $K_{area}(Reg\_costs)$ + $K_{power}(0)$ | $K_{area}(Reg\_costs)$ + $K_{power}(0)$ | ... |
| R7 | $K_{area}(C_{MUX}$ + Reg_costs) + $K_{power}[Power(C_{MUX})]$ | $K_{area}(Reg\_costs)$ + $K_{power}(0)$ | $K_{area}(Reg\_costs)$ + $K_{power}(0)$ | ... |
| R8 | $K_{area}(C_{MUX}$ + Reg_costs) + $K_{power}[Power(C_{MUX})]$ | $K_{area}(Reg\_costs)$ + $K_{power}(0)$ | $K_{area}(Reg\_costs)$ + $K_{power}(0)$ | ... |

In this embodiment the matrix that is actually generated is a square matrix. High value false scores are generated for the entries in the columns beyond the variables in the cluster. This is to balance the matrix. The Hungarian algorithm can yield a false answer if the problem is unbalanced.

Variables f, g and h in cluster 1 cannot use either registers R1 or R2 since variables a and b from cluster 0 are still using those registers when variables f to h are first used. These allocations are represented as not being possible by containing a high score as generated in Equation 7 above. Moreover, registers R3 and R4 are still used by variables c and d, respectively when variable f is first used. However, that is no longer the case when variables g and h are first used. Thus there are values in Table 2 above for variables g and h in registers R3 and R4.

The cost entries for each combination are $K_{area}$(Explicit Area Cost+Implicit Area cost-Eq 7a)+$K_{power}$(Power Cost-Eq 8). For example for the combination of Variable g with register R4:

$$\text{Explicit Area Cost} = [(\overline{(Overlap(i,j))} * \qquad [6]$$
$$[((fu_i == fu_j) \cdot \overline{Overlap(fu_i, fu_j)}) *$$
$$C_{MUX}] + Overlap(i,j) * MAX] + 0$$
$$[(\overline{0}) * \overline{(0) \cdot (0)} * C_{MUX}] + (0) * MAX,$$

$[(0)*\overline{(0).(0)}*C_{MUX}]+(0)*MAX$, since there is no overlap of shared variables, no overlap in the functional units, the same functional unit has not been allocated to both shared variables.

$$= 1 * 1 * C_{MUX}$$
$$= C_{MUX}$$

$$\text{Implicit Area Cost} = [(\overline{(Overlap(i,j))} * \qquad [6]$$
$$[((fu_i == fu_j) \cdot \overline{Overlap(fu_i, fu_j)}) *$$
$$C_{MUX}] + Overlap(i,j) * MAX] + 0$$
$$[(\overline{0}) * \overline{(0) \cdot (0)} * C_{MUX}] + (0) * MAX,$$

since there is no overlap of shared variables, no overlap in the functional units, the same functional unit has not been allocated to both shared variables.

$$= 1 * 1 * C_{MUX\_implicit}$$
$$= C_{MUX\_implicit}$$

There is no additional register area cost associated with Variable g using register R4, since R4 is going to be present anyway, as it is going to be used by Variable d in Cluster 0. However, there is an MUX area cost, as the sharing of the register means that a multiplexer is now required. The implicit MUX area cost is used only for computation for area cost. The implicit MUX area cost is left out in the power cost computation as this cost is not necessarily incurred.

$$\text{Power Cost} = \left[ SA_{Var1} \sum_{i=1}^{n_{Var2}} Power_1 + SA_{Var2} \sum_{i=1}^{n_{Var1}} Power_i \right] + \qquad [8]$$
$$[\text{Power}(C_{MUX}$$
$$= SA(g) \cdot Power(FU1^{\ll}) + SA(d) \cdot Power(FU1^*) +$$
$$\text{Power}(C_{MUX})$$

As register R4 has already been allocated to Variable d in Cluster 0, the switching activity of Variable d is relevant, as is the power consumption from spurious activities for the destination functional unit used by variable d, that is shifter 1 (from Table 1), and the power cost for the MUX that will be necessary for sharing the register.

For Variable f being assigned to Register R6, there are register area costs because this would be the first time Register R6 is assigned. There would also be an MUX cost because the destination for Variable f is the same as that for Variable e, which has already been assigned to Register R5. Additionally there will be a power cost associated with the MUX.

For Variable h being assigned to Register R8, there are register area costs because this would be the first time Register R8 is assigned. However, there will be no power management costs (from this allocation at least) because Register R8 is not being shared with any other variable which may then have a different destination module.

Using the process described, at least one of the register area cost and power management cost for a register allocation will always be zero. There may, however, be an MUX area cost at the same time as a power management cost. The register will either be being allocated for a second time, so there are no extra register area costs but there may be MUX area costs, or the register is being assigned for the first time, in which case it is not shared and there will be no power management costs.

When $K_{area}$ is very large compared with $K_{power}$, Variables f, g and h are assigned to Registers R3, R4 and R5 (although not in that order) and extra registers R6, R7 and R8 are not needed, leading to a smaller area but imperfect power management. Variable f will be allocated to R5 as only $C_{MUX}$ costs are incurred for this assignment. The Hungarian algorithm automatically determines the actual allocation of Variables g and h between Registers R3 and R4 for the best power management cost in this case, based on a comparison between the power costs for the two different possible allocation combinations:

$SA(g).\text{Power}(FU4^+)+SA(c).\text{Power}(FU1^*)+SA(h).\text{Power}(FU1^{<<})+SA(d).\text{Power}(FU1')+\text{Power}(C_{MUX})$ and $SA(h).\text{Power}(FU4^+)+SA(c).\text{Power}(FU1')+SA(g).\text{Power}(FU1^{<<})+SA(d).\text{Power}(FU1^*)+\text{Power}(C_{MUX})$.

On the other hand, when $K_{power}$ is much larger than $K_{area}$, Variables f, g and Variable h are assigned to three new registers R6, R7 and R8. The actual allocation can be random as there are only area costs to consider and the area costs are the same for each register. Alternatively, as an example, where the costs are the same, the lower number variable is assigned to the lower number register and gaps are not left in the register numbers that are used.

Consider the case where the values of $K_{power}$ and $K_{area}$ result in costs matrices that are roughly equal. Variable f is either allocated to register R5 or a new register from {R6, R7, R8} and the likely possible outcomes for the assignments of Variable g and h are as follows:

Variable g is assigned to R3, Variable h is assigned to R4 or one of the new registers {R6, R7 or R8} that is not yet assigned;

Variable g is assigned to R4, Variable h is assigned to R3 or one of the new registers {R6, R7 or R8} that is not yet assigned;

Variable g and Variable h are assigned to two new registers from {R6, R7 and R8} that are not yet assigned.

In any event, neither variables g or h will be assigned to register R5, since if the costs associated with the MUX are lower than those associated with the register, the total score will always be lower with variable f at register R5, than if variable g or h were allocated there.

In the above examples, the MUX costs are all the same as the MUXs have two inputs each and are assumed to have the same bit width (for example 32 bits). The Reg_Costs are also all the same for R6 to R8 as the registers are also only for single variables at this time.

The Hungarian algorithm solves the assignment in the Bipartite weighted assignment, minimising the overall costs incurred. Power and Area weights are used to guide the allocation. The mechanism of the embodiment automatically determines the number of registers to be allocated with the constraints and priority specified.

Figure 14:
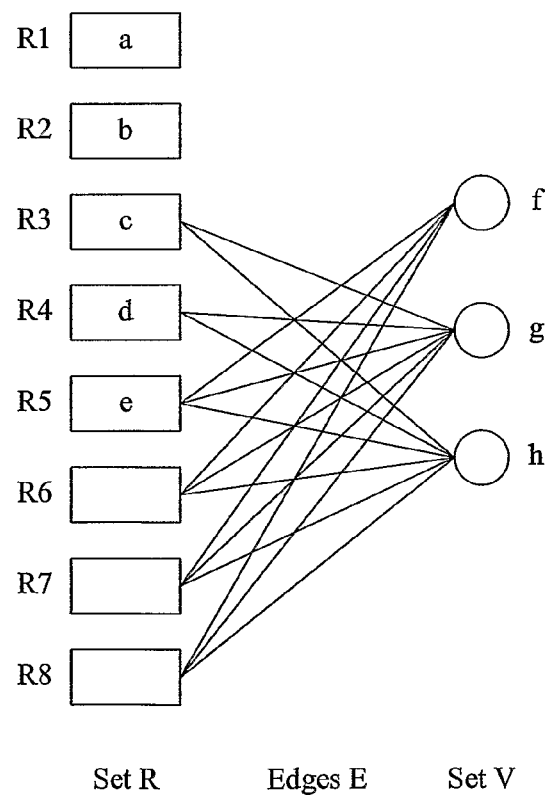
FIG. 14 is an example of a bipartite graph showing the possible allocations of variables to registers.

FIG. 14 is an example of a bipartite graph showing the possible allocations of variables to registers, for Cluster 2 of FIG. 13, after the variables of Cluster 1 have been allocated. In a bipartite graph, the node set is partitioned into two disjoint subsets. Every edge connects two nodes in the different subsets. In register allocation of the second cluster of the example shown in FIG. 13, the two subsets of the graph has two sets, the set of registers, $R=\{r_i, r_2, r_3, r_4, r_5, r_6, r_7, r_8\}$ and the set of variables, $V=\{v_f, v_g, v_h\}$, as shown in FIG. 14. Where the registers already have a variable allocated to them, the variable number appears within the relevant node in FIG. 14. The graph has a set of edges, representing possible matches $E=\{e_{3,g}, e_{3,h}, e_{4,g}, e_{4,h}, e_{5,f}, e_{5,g}, e_{5,h}, e_{6,f}, e_{6,g}, e_{6,h}, e_{7,f}, e_{7,g}, e_{7,h}\}$. The problem of matching each variable to a register is modelled as a classic job-assignment problem. The largest subset of edges that do not have any common endnodes is defined as the maximal matching of the graph, where the maximal edge-weight matching of a graph is the maximal matching with the largest sum of the weights of its edges. This helps to ensure that these edges will not compete with the other edges in the Bipartite weight assignments as they are not valid edges.

Figure 15:
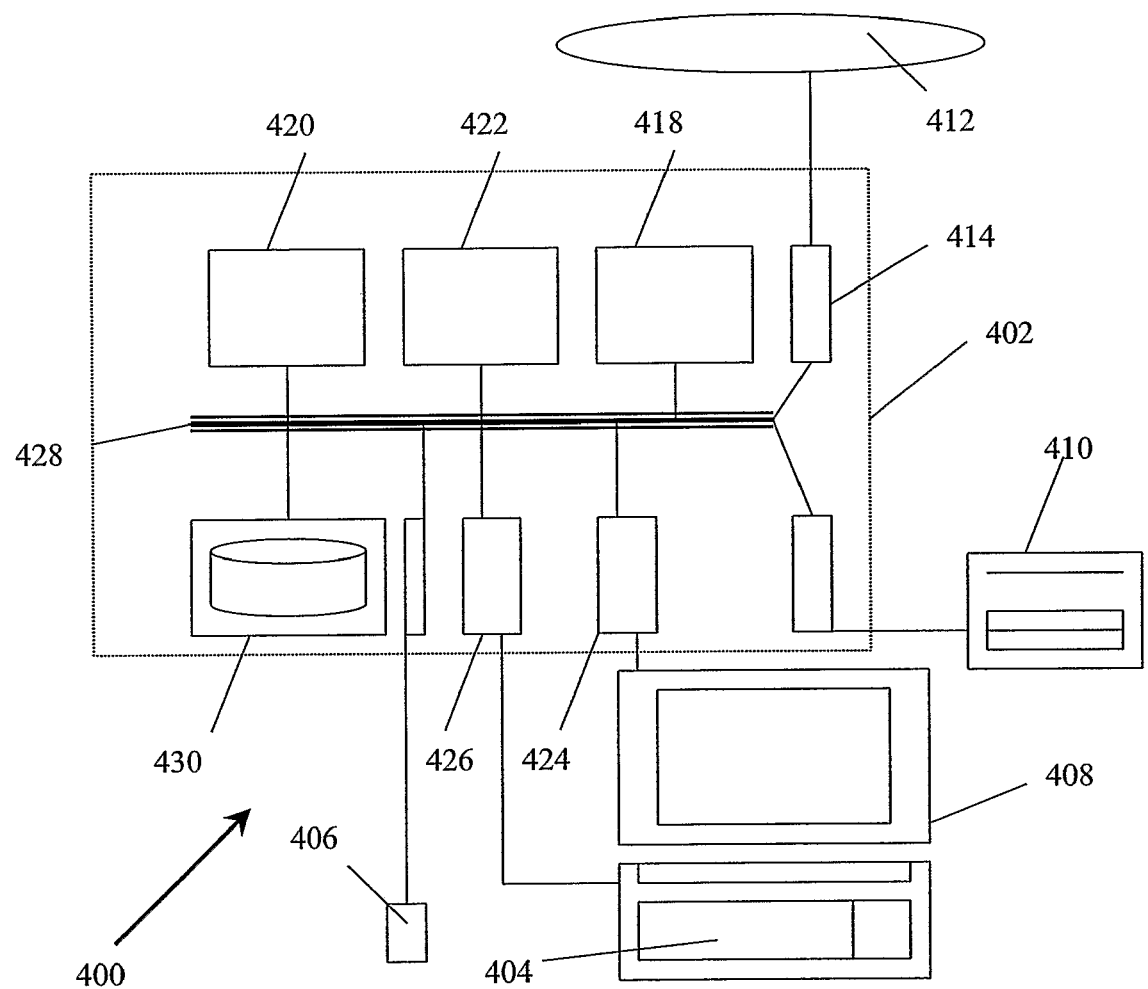
FIG. 15 is an illustration of a computer system for implementing the apparatus and processes associated with the exemplary embodiment.

The apparatus and processes of the exemplary embodiments can be implemented on a computer system 400, for example as schematically shown in FIG. 15. The embodiments may be implemented as software, such as a computer program being executed within the computer system 400, and instructing the computer system 400 to conduct the method of the example embodiment.

The computer system 400 comprises a computer module 402, input modules such as a keyboard 404 and mouse 406 and a plurality of output devices such as a display 408, and printer 410.

The computer module 402 is connected to a computer network 412 via a suitable transceiver device 414, to enable access to e.g. the Internet or other network systems such as Local Area Network (LAN) or Wide Area Network (WAN).

The computer module 402 in the example includes a processor 418, a Random Access Memory (RAM) 420 and a Read Only Memory (ROM) 422. The computer module 402 also includes a number of input/output (I/O) interfaces, for example an I/O interface 424 to the display 408, and an I/O interface 426 to the keyboard 404. The keyboard 404 may, for example be used by the chip designer to specify the power and area constraints and their relative importance in the optimisation to suit chips of different optimisation needs.

The components of the computer module 402 typically communicate via an interconnected bus 428 and in a manner known to the person skilled in the relevant art.

The application program is typically supplied to the user of the computer system 400 encoded on a data storage medium such as a CD-ROM or floppy disc and read utilising a corresponding data storage medium drive of a data storage device 430. The application program is read and controlled in its execution by the processor 418. Intermediate storage of program data may be accomplished using the RAM 420.

Effects

The method and apparatus to produce high-level synthesis Register Transfer Level designs utilises a trade-off between power dissipation and area usage in data path allocation. Power dissipation and area constraints and a priority between them are input. An algorithm automatically decides the number of registers that are to be used, according to the specified priority and constraints specified. Power management formulations can be used to gear the allocation process to trade lower power management costs for equivalent savings in register areas. Multi-criteria optimisation Integer Linear Programming is utilised with heuristically determined power and area weightings to suit different predefined requirements of the chip design. Bipartite weighted Assignment is used to determine the number of registers to be used at every stage, through cost formulations and the Hungarian Algorithm.

Contemporary chip design caters to applications with varying requirements. Chips used for portable devices and chips of high densities have power as the chief optimisation priority in their developments. On the other hand, in the development of chips that cater to non-portable applications, area considerations generally precede those of power. This above embodiment provides interactive facilities that allow a user to specify the priority of the data path allocation optimisation (area/power) and the respective constraints (area and power) to be met. These interactive features allow the user to determine a data path allocation based on the applications the chip serves and the constraints imposed onto it.

The described embodiment alleviates some of the problems with the prior art by providing a mechanism that can trade power management costs for area along an optimal power-area trade-off design locus. The formulation of power management costs gear the allocation to trade minimal power management costs for an equivalent area, utilising the rate at which the variables are switched and the power lost through imperfect management for the modules as parameters in the formulation. Where area is the priority in optimisation, the iterative data path allocation results in an architecture that trades the minimum area for power to fulfil the power constraint specified by user through the user interface. Where power is the priority in optimisation, the iterative data path allocation arrives at an architecture that trades the minimum power for area to fulfil the area constraint specified by the user through the user interface.

The data path allocation is carried out using Bipartite Weighted assignments, with the Hungarian algorithm performed to solve the matching problems of these assignments. The Hungarian algorithm has a low complexity of $O(n^3)$ and thus the assignments are not time consuming.

The above embodiments are described with reference to allocating data paths to a electronic circuit, for instance for a decoder or encoder. However, the processes described could be used for allocating data paths for other circuits, such as an optical/photonic one, as would readily be understood by the man skilled in the art.

In the foregoing manner, a method and apparatus for allocating data paths are disclosed. Only several embodiments are described but it will be apparent to one skilled in the art in view of this disclosure that numerous changes and/or modifications may be made without departing from the scope of the invention.

What is claimed is:

1. A method of data path allocation for a circuit, the method comprising: using a computer system for:
    (a) generating an initial allocation of resources for the circuit based on a tradeoff between area usage and power usage;
    (b) determining if the allocation of resources meets a predetermined first constraint for the circuit; and, if the first constraint is not met;
    (c) adjusting the trade-off balance and generating a revised allocation of resources based on the adjusted trade-off balance; and
    repeating (b) and (c) until the first constraint is determined to be met.

2. A method according to claim 1, wherein generating an initial allocation of resources comprises allocating resources on the basis of a priority between lower area and lower power usage.

3. A method according to claim 2, wherein, if the priority is lower area over lower power, generating an initial allocation of resources comprises allocating resources on the basis of high amounts of register sharing.

4. A method according to claim 3, wherein, if the priority is lower area over lower power, generating an initial allocation of resources comprises allocating resources on the basis of as many registers sharing as possible.

5. A method according to claim 2, wherein, if the priority is lower area over lower power, at the repeating (b) and (c) step, the repeatedly generating a revised allocation of resources comprises iteratively increasing area usage and decreasing power usage until the first constraint is met.

6. A method according to claim 2, wherein, if the priority is lower power over lower area, generating an initial allocation of resources comprises allocating resources on the basis of good power management.

7. A method according to claim 6, wherein, if the priority is lower power over lower area, generating an initial allocation of resources comprises allocating resources on the basis of perfect power management.

8. A method according to claim 2, wherein, if the priority is lower power over lower area, at the repeating (b) and (c) step, the repeatedly generating a revised allocation of resources comprises iteratively increasing power usage and decreasing area usage until the first constraint is met.

9. A method according to claim 2, further comprising inputting the priority between lower area and lower power usage.

10. A method according to claim 2, wherein, if the priority is lower power over lower area, the trade-off is between higher area use for lower power use.

11. A method according to claim 10, wherein accepting higher area use for lower power use comprises allocating more variables that are shared between registers to separate registers.

12. A method according to claim 11, wherein variables used more frequently are targeted to be allocated to separate registers in earlier repeats of generating a revised allocation of resources than variables used less frequently.

13. A method according to claim 11, wherein variables destined for operations whose power consumption is higher are targeted to be allocated to separate registers in earlier repeats of generating a revised allocation of resources than variables destined for operations whose power consumption is lower.

14. A method according to claim 2, wherein, if the priority is lower area over lower power, the trade-off is between higher power use for lower area use.

15. A method according to claim 14, wherein accepting higher power use for lower area use comprises allocating more variables to be shared between registers.

16. A method according to claim 15, wherein variables used less frequently are targeted to be allocated to be shared between registers in earlier repeats of generating a revised allocation of resources than variables used more frequently.

17. A method according to claim 15, wherein variables destined for operations whose power consumption is lower are targeted to be allocated to be shared between registers in earlier repeats of generating a revised allocation of resources than variables destined for operations whose power consumption is higher.

18. A method according to claim 1, wherein generating a revised allocation of resources comprises determining a cost associated with a plurality of possible allocations and selecting an allocation based on the associated costs.

19. A method according to claim 18, wherein selecting an allocation based on the associated costs comprises selecting the allocation with the lowest associated cost.

20. A method according to claim 1, wherein a power weighting is given to power usage and a cost is associated with an allocation of a resource based on power usage associated with the allocation and the power weighting.

21. A method according to claim 20, wherein generating a revised allocation of resources further comprises changing the weighting or at least one of the weightings.

22. A method according to claim 1, wherein an area weighting is given to area usage and a cost is associated with an allocation of a resource based on area usage associated with the allocation and the area weighting.

23. A method according to claim 1, further comprising using switching activities for variables in determining a trade-off between area and power usage.

24. A method according to claim 23, further comprising inputting information on the switching activities for variables.

25. A method according to claim 24, wherein the switching activities are input by a user by way of a compiler directive.

26. A method according to claim 23, further comprising automatically determining switching activities for variables.

27. A method according to claim 26, wherein default values for switching activities are determined when values are not input.

28. A method according to claim 23, further comprising calculating the relative power dissipation costs from sharing a common register between 2 variables by multiplying, for each of the 2 variables, the rate of switching of the variable to the power metrics of a functional unit connected to the other variable to indicate spurious power dissipations introduced in the sharing process.

29. A method according to claim 28, wherein the relative power dissipation costs are calculated according to the following formulation:

$$\text{Power management cost} = SA_{Var1} \sum_{i=1}^{n_{var2}} Power_i + SA_{Var2} \sum_{i=1}^{n_{var1}} Power_i$$

where
Var1 is the variable being allocated to the Register
Var2 is the variable which previously used this Register
SA is the switching activity of the variable with respect to all variables,
n is the number of destination operations,
Power is the normalised power consumption of the allocated functional unit that is not shared by the two variables.

30. A method according to claim 1, wherein generating allocations of resources comprises allocating operations and variables in the data path to modules and registers, respectively.

31. A method according to claim 30, further comprising generating groups of operations that can use the same modules.

32. A method according to claim 30, further comprising generating clusters of operations that have overlapping lifetimes when allocating operations to modules.

33. A method according to claim 32, wherein the operations are clustered by ability to use the same module and overlapping lifetimes.

34. A method according to claim 30, further comprising generating clusters of variables that have overlapping lifetimes when allocating variables to registers.

35. A method according to claim 1, further comprising determining relative area costs for different allocations of operations to functional units.

36. A method according to claim 35, wherein the area costs comprise area costs of multiplexers.

37. A method according to claim 35, wherein the area costs comprise explicit area costs in a particular allocation.

38. A method according to claim 37, wherein the area costs further comprise implicit area costs in a particular allocation.

39. A method according to claim 1, further comprising determining relative area costs for different allocations of variables to registers.

40. A method according to claim 39, wherein the area costs comprise area costs of registers.

41. A method according to claim 1, wherein generating allocations of resources further comprises using Bipartite Weighted Assignment allocation, with weights for power and area usage.

42. A method according to claim 41, further comprising changing the relative weighting for power and area usage when generating a revised allocation of resources.

43. A method according to claim 1, wherein generating allocations of resources further comprises solving allocation matching problems using the Hungarian algorithm.

44. A method according to claim 1, wherein the trade-off balance between area usage and power usage comprises co-optimising both area and power by satisfying the following equation:

$$\min_{x \in C} f(x = \begin{bmatrix} K_{power} & f_{power}(x) \\ K_{area} & f_{area}(x) \end{bmatrix} \quad (1)$$

where
$f_{power}$ (x) is the cost formulation of power
$f_{area}$ (x) is the cost formulation of area
C={constraints of minimum number of registers or functional units at maximum relevant densities}
$K_{power}$ is the weight of $f_{power}$ (x), and
$K_{area}$ is the weight of $f_{area}$ (x).

45. A method according to claim 1, wherein the predetermined first constraint is one of a predetermined area constraint and a predetermined power usage constraint.

46. A method according to claim 45, wherein a predetermined second constraint is the other of the predetermined area constraint and the predetermined power usage constraint and (b) further comprises determining if the predetermined second constraint is met.

47. A method according to claim 45, wherein a predetermined second constraint is the other of the predetermined area constraint and the predetermined power usage constraint and further comprising, after the first constraint is determined to have been met, determining if the predetermined second constraint is met.

48. A method according to claim 1, further comprising inputting at least the predetermined first constraint.

49. An apparatus for data path allocation comprising:
means for generating an initial allocation of resources based on a trade-off balance between area usage and power usage;
means for determining if the allocation of resources meets at least one predetermined constraint, the at least one predetermined constraint comprising at least one of a predetermined area constraint and a predetermined power usage;

means for adjusting the trade-off balance and generating a revised allocation of resources based on the adjusted trade-off balance;
means for determining if the revised allocation meets the at least one predetermined constraint; and
means for controlling the apparatus to adjust the trade-off balance and generate revised allocations and determine if the revised allocation meets the at least one predetermined constraint until the at least one constraint is met.

50. A computer readable storage medium stored on a computer storage device, the medium having stored thereon computer code for instructing a computer processor to execute a method of data path allocation for a circuit, the method comprising:

(a) generating an initial allocation of resources for the circuit based on a trade-off balance between area usage and power usage;
(b) determining if the allocation of resources meets a predetermined first constraint for the circuit; and, if the first constraint is met;
(c) adjusting the trade-off balance and generating a revised allocation of resources based on the adjusted trade-off balance; and
repeating (b) and (c) until the first constraint is determined to be met.

* * * * *